(12) United States Patent
Kobayashi et al.

(10) Patent No.: US 7,788,208 B2
(45) Date of Patent: Aug. 31, 2010

(54) BEHAVIOR PREDICTION APPARATUS AND METHOD THEREFOR

(75) Inventors: Hideki Kobayashi, Yokohama (JP); Naoki Imasaki, Kamakura (JP); Ryohei Orihara, Tokyo (JP); Tomoko Murakami, Yokohama (JP); Takashi Koiso, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 835 days.

(21) Appl. No.: 11/531,453

(22) Filed: Sep. 13, 2006

(65) Prior Publication Data

US 2007/0233631 A1 Oct. 4, 2007

(30) Foreign Application Priority Data

Mar. 13, 2006 (JP) ............................. 2006-068277

(51) Int. Cl.
*G06F 9/44* (2006.01)
*G06N 7/02* (2006.01)
*G06N 7/06* (2006.01)

(52) U.S. Cl. ....................................................... 706/52
(58) Field of Classification Search ..................... 706/52
See application file for complete search history.

(56) References Cited

U.S. PATENT DOCUMENTS

| | | | | |
|---|---|---|---|---|
| 6,021,403 | A * | 2/2000 | Horvitz et al. ................. | 706/45 |
| 6,807,535 | B2 * | 10/2004 | Goodkovsky ................... | 706/3 |
| 7,072,805 | B2 * | 7/2006 | Cascaval et al. ............. | 702/196 |
| 7,212,112 | B2 * | 5/2007 | Barber et al. ............ | 340/539.2 |
| 7,212,129 | B2 * | 5/2007 | Barber et al. ............ | 340/573.2 |
| 7,249,088 | B2 * | 7/2007 | Guler et al. ................... | 705/37 |

(Continued)

FOREIGN PATENT DOCUMENTS

JP 06-282218 10/1994

(Continued)

OTHER PUBLICATIONS

Multi-agent cooperation based on behavior prediction and reinforcement learning Dongyong Yang; Xuejiang Chen; Jingping Jiang; Intelligent Control and Automation, 2004. WCICA 2004. Fifth World Congress on vol. 6, Jun. 15-19, 2004 pp. 4869-4872 vol. 6 Digital Object Identifier 10.1109/WCICA.2004.1343636.*

(Continued)

*Primary Examiner*—Michael B Holmes
(74) *Attorney, Agent, or Firm*—Oblon, Spivak, McClelland, Maier & Neustadt, L.L.P.

(57) ABSTRACT

A behavior prediction apparatus includes an input unit inputting sole behaviors of a human and simultaneous occurrence probability of behaviors, a behavior discrimination unit specifying a behavior pattern based on correspondence between behaviors corresponding to simultaneous occurrence probability and actual behaviors, an information generation/recording unit generating behavior history information of the specified behavior pattern, and to generate and record information of each of a behavior transition probability, a behavior time and a behavior occurrence probability based on the behavior history information, a behavior prediction unit obtaining a starting behavior from the behavior occurrence probability, select another behavior pattern in order of behavior occurrence probability, and add the behavior time to the selected behavior pattern to output behavior prediction information, and a social value calculation unit obtaining a social value per unit time using the behavior prediction information, social value unit information and the prediction period.

21 Claims, 24 Drawing Sheets

U.S. PATENT DOCUMENTS

| | | | |
|---|---|---|---|
| 7,262,702 B2 * | 8/2007 | Barber et al. | 340/573.1 |
| 7,289,939 B2 * | 10/2007 | Cascaval et al. | 702/196 |
| 7,289,985 B2 * | 10/2007 | Zeng et al. | 707/3 |
| 7,305,389 B2 * | 12/2007 | Zeng et al. | 707/5 |
| 7,333,977 B2 * | 2/2008 | Swaminathan et al. | 707/3 |
| 7,340,393 B2 * | 3/2008 | Mitsuyoshi | 704/207 |
| 7,348,890 B2 * | 3/2008 | Barber et al. | 340/573.2 |
| 7,350,138 B1 * | 3/2008 | Swaminathan et al. | 715/234 |
| 7,403,911 B2 * | 7/2008 | Guler et al. | 705/26 |
| 7,463,890 B2 * | 12/2008 | Herz et al. | 455/445 |
| 7,487,918 B2 * | 2/2009 | Kudo et al. | 235/472.01 |
| 7,492,971 B2 * | 2/2009 | Sakuma et al. | 382/305 |
| 7,493,280 B2 * | 2/2009 | Guler et al. | 705/37 |
| 7,529,721 B2 * | 5/2009 | Jannarone et al. | 706/52 |
| 7,574,661 B2 * | 8/2009 | Matsuura et al. | 715/745 |
| 7,587,330 B1 * | 9/2009 | Shan | 705/10 |
| 7,627,514 B2 * | 12/2009 | Guler et al. | 705/37 |

FOREIGN PATENT DOCUMENTS

| | | |
|---|---|---|
| JP | 09-053957 | 2/1997 |
| JP | 2000-321091 | 11/2000 |
| JP | 2001-236431 | 8/2001 |
| JP | 2002-259763 | 9/2002 |
| JP | 2002-352352 | 12/2002 |
| JP | 2003-079592 | 3/2003 |
| JP | 2004-350847 | 12/2004 |
| JP | 2005-327134 | 11/2005 |
| JP | 2005-332345 | 12/2005 |
| JP | 2006-058942 | 3/2006 |

OTHER PUBLICATIONS

Predicting customer behavior in telecommunications Lian Yan; Wolniewicz, R.H.; Dodier, R.; Intelligent Systems, IEEE vol. 19, Issue 2, Mar.-Apr. 2004 pp. 50-58 Digital Object Identifier 10.1109/MIS.2004.1274911.*

A modeling method for predicting driving behavior concerning with driver's past movements Kishimoto, Y.; Oguri, K.; Vehicular Electronics and Safety, 2008. ICVES 2008. IEEE International Conference on Sep. 22-24, 2008 pp. 132-136 Digital Object Identifier 10.1109/ICVES.2008.4640888.*

Prediction of Abnormal Behaviors for Intelligent Video Surveillance Systems Duque, D.; Santos, H.; Cortez, P.; Computational Intelligence and Data Mining, 2007. CIDM 2007. IEEE Symposium on Mar. 1, 2007-Apr. 5, 2007 pp. 362-367 Digital Object Identifier 10.1109/CIDM.2007.368897.*

U.S. Appl. No. 11/684,145, filed Mar. 9, 2007, Kumazawa et al.

Shigeki Aoki, et al., "Detection of a Solitude Senior's Irregular States Based on Learning and Recognizing of Behavioral Patterns", IEEJ Trans SM, vol. 125, No. 6, 2005, pp. 259-265.

U.S. Appl. No. 11/857,068, filed Sep. 18, 2007, Kobayashi et al.

Taketoshi Mori, Behavior Accumulation and Pattern Discovery in Sensing Room, vol. 2005, No. 78, IPSJ SIG Technical Reports, Information Processing Society of Japan, Aug. 2, 2005, pp. 41-45.

Michio Sugeno, An Approach to Social System Simulation based on Linguistic Information, vol. 6, #4, Journal of Japan Society for Fuzzy Theory and Systems, Aug. 15, 1994, pp. 701-719.

US 7,698,247, 04/2010, Kobayashi et al. (withdrawn)*

* cited by examiner

Pre-processing / data recording

Behavior prediction / recommendation

FIG. 4

A Input data

Simultaneous occurrence probability matrix S1

| | Television | Cooking | dryer use | Eating | Dish care | Radio |
|---|---|---|---|---|---|---|
| Television | 0 | 1 | 1 | 1 | 1 | 0 |
| Cooking | | 0 | 0 | 0 | 0 | 1 |
| dryer use | | | | 0 | 0 | 0 |
| Eating | | | | | 0 | 1 |
| Dish care | | | | | | 1 |
| Radio | | | | | | 0 |

B Developed result

Simultaneous occurrence probability matrix S2

| | Television | Cooking | dryer use | Eating | Dish care | Radio |
|---|---|---|---|---|---|---|
| Television | 0 | 1 | 1 | 1 | 1 | 0 |
| Television & cooking | 0 | 0 | 0 | 0 | 0 | 0 |
| Television & dryer use | 0 | 0 | 0 | 0 | 0 | 0 |
| Television & eating | 0 | 0 | 0 | 0 | 0 | 0 |
| Television & dish care | 0 | 0 | 0 | 0 | 0 | 1 |
| Cooking | 1 | 0 | 0 | 0 | 0 | 0 |
| Cooking & radio | 0 | 0 | 0 | 0 | 0 | 1 |
| dryer use | 1 | 0 | 0 | 0 | 0 | 0 |
| Eating | 0 | 0 | 0 | 0 | 0 | 1 |
| Eating & radio | 1 | 0 | 0 | 0 | 0 | 0 |
| Dish care | 0 | 0 | 0 | 0 | 0 | 1 |
| Dish care & radio | 0 | 1 | 0 | 0 | 1 | 0 |
| Radio | 0 | 0 | 0 | 1 | 0 | 0 |

|  | Behavior pattern | Television watching | Dryer use | Television watching & dryer use | Bathing |
|---|---|---|---|---|---|
| Input patterns | Turn on television | 1 | 0 | 1 | 0 |
| | Turn on dryer | 0 | 1 | 1 | 0 |
| | Open refrigerator door | 0 | 0 | 0 | 0 |
| | Turn on light (bath) | 0 | 0 | 0 | 1 |
| | Turn on light (kitchen) | 0 | 0 | 0 | 0 |
| | .... | | | | |
| | Presence (bath) | 0 | 0 | 0 | 1 |
| | Presence (kitchen) | 0 | 0 | 0 | 0 |
| | Presence (living room) | 1 | 1 | 1 | 0 |
| | .... | | | | |
| | Average speech level [dB] | <55 | <50 | <55 | <60 |
| | Average vertical acceleration [cm/sec$^2$] | <2.5 | <3.0 | <3.0 | <25 |
| | Horizontal direction accelerate dispersion value [cm/sec$^2$] | <2.5 | <3.0 | <3.0 | <25 |

F I G. 5

| Month | Day | Week | Time | Behavior pattern |
|---|---|---|---|---|
| 2 | 4 | Sunday | 9:00-9:05 | Eating |
| 2 | 4 | Sunday | 9:05-9:10 | Eating |
| 2 | 4 | Sunday | 9:10-9:15 | Toilet |
| 2 | 4 | Sunday | 9:15-9:20 | Television watching |
| 2 | 4 | Sunday | 9:20-9:25 | Television watching |
| 2 | 4 | Sunday | 9:25-9:30 | Television watching & dryer use |

February 4 sunday 8:00 - 10:00  
Unit: number of transition times

| Behavior | | 1 Cooking | 2 Eating | 3 Dish care | ... j ... | N-2 Toilet | N-1 Television watching | N Sleeping | Total |
|---|---|---|---|---|---|---|---|---|---|
| 1 | Cooking | 0 | 1 | 0 | | 0 | 0 | 0 | 1 |
| 2 | Eating | 0 | 0 | 1 | | 0 | 0 | 0 | 1 |
| 3 | Dish care | 0 | 0 | 0 | | 1 | 1 | 0 | 2 |
| i | | | | | | | | | |
| N-2 | Toilet | 1 | 0 | 0 | | 0 | 1 | 0 | 2 |
| N-1 | Television watching | 0 | 0 | 0 | | 0 | 0 | 1 | 1 |
| N | Sleeping | 1 | 0 | 0 | | 0 | 0 | 0 | 1 |

F I G. 9

February 4 sunday 8:00 - 10:00

Unit : number of transition times

| Behavior | | 1 | 2 | 3 | ... j ... | N-2 | N-1 | N | Total |
|---|---|---|---|---|---|---|---|---|---|
| | Behavior | Cooking | Eating | Dish care | | Toilet | Television watching | Sleeping | |
| 1 | Cooking | 0 | 1 | 0 | 0 | 0 | 0 | 0 | 1 |
| 2 | Eating | 0 | 0 | 1 | 0 | 0 | 0 | 0 | 1 |
| 3 | Dish care | 0 | 0 | 0 | 0 | 0.5 | 0.5 | 0 | 1 |
| i | | | | | $A_{ij}$ | | | | |
| N-2 | Toilet | 0.5 | 0 | 0 | 0 | 0 | 0.5 | 0 | 1 |
| N-1 | Television watching | 0 | 0 | 0 | 0 | 0 | 0 | 0 | 0 |
| N | Sleeping | 1 | 0 | 0 | 0 | 0 | 0 | 0 | 1 |

F I G. 10

February 4 sunday 8:00 - 10:00

| Behavior | | Behavior occurrence probability |
|---|---|---|
| 1 | Cooking | 0.21 |
| 2 | Eating | 0.29 |
| 3 | Dish care | 0.17 |
| i | | $P_i$ |
| N-2 | Toilet | 0.08 |
| N-1 | Television watching | 0.13 |
| N | Sleeping | 0.08 |
| | | 1 |

FIG. 15

| No. | Action | Action items | Environmental load unit consumption (kg - $CO_2$/hour) |
|---|---|---|---|
| 1 | Sleeping | | 0.0007 |
| 2 | Personal errand | | 0.5357 |
| 3 | Eating | | 0.2893 |
| 19 | Learning / study (other than academics) | Other than English | 1.4000 |
| 20 | Learning / study (other than academics) | Personal computer, etc. | 0.6000 |
| 21 | Learning / study (other than academics) | Commercial practical business | 0.9000 |
| 22 | Learning / study (other than academics) | Care relation | 1.0000 |
| 23 | Learning / study (other than academics) | domestic economy / domestic affairs | 1.2500 |
| 24 | Learning / study (other than academics) | humanity, social science, natural science | 0.4167 |
| 25 | Learning / study (other than academics) | Art / culture | 0.4167 |
| 26 | Learning / study (other than academics) | Other | 2.1050 |
| 27 | Taste / entertainment | Spectator sports | 1.5000 |
| 28 | Taste / entertainment | Art appreciation | 1.5000 |
| 29 | Taste / entertainment | Theatrics / drama | 3.3750 |
| 30 | Taste / entertainment | Cinema viewing | 1.6685 |
| 31 | Taste / entertainment | Classical music listening | 3.3750 |
| 32 | Taste / entertainment | Popular music listening | 3.3750 |
| 33 | Taste / entertainment | Musical instrument performance | 1.2000 |
| 34 | Taste / entertainment | Japanese musical performance | 1.2000 |
| 35 | Taste / entertainment | Flower arrangement | 2.2500 |

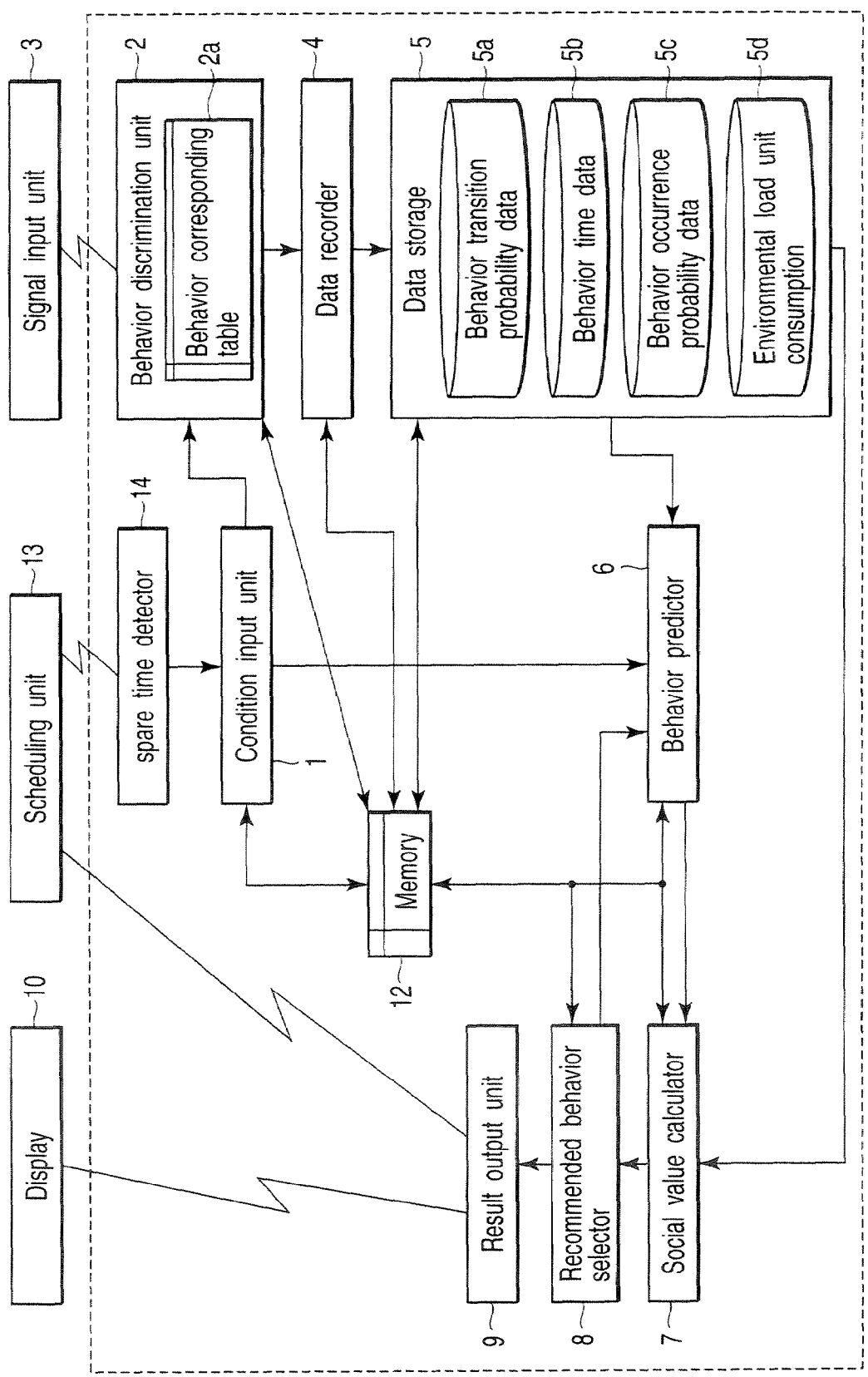
F I G. 21

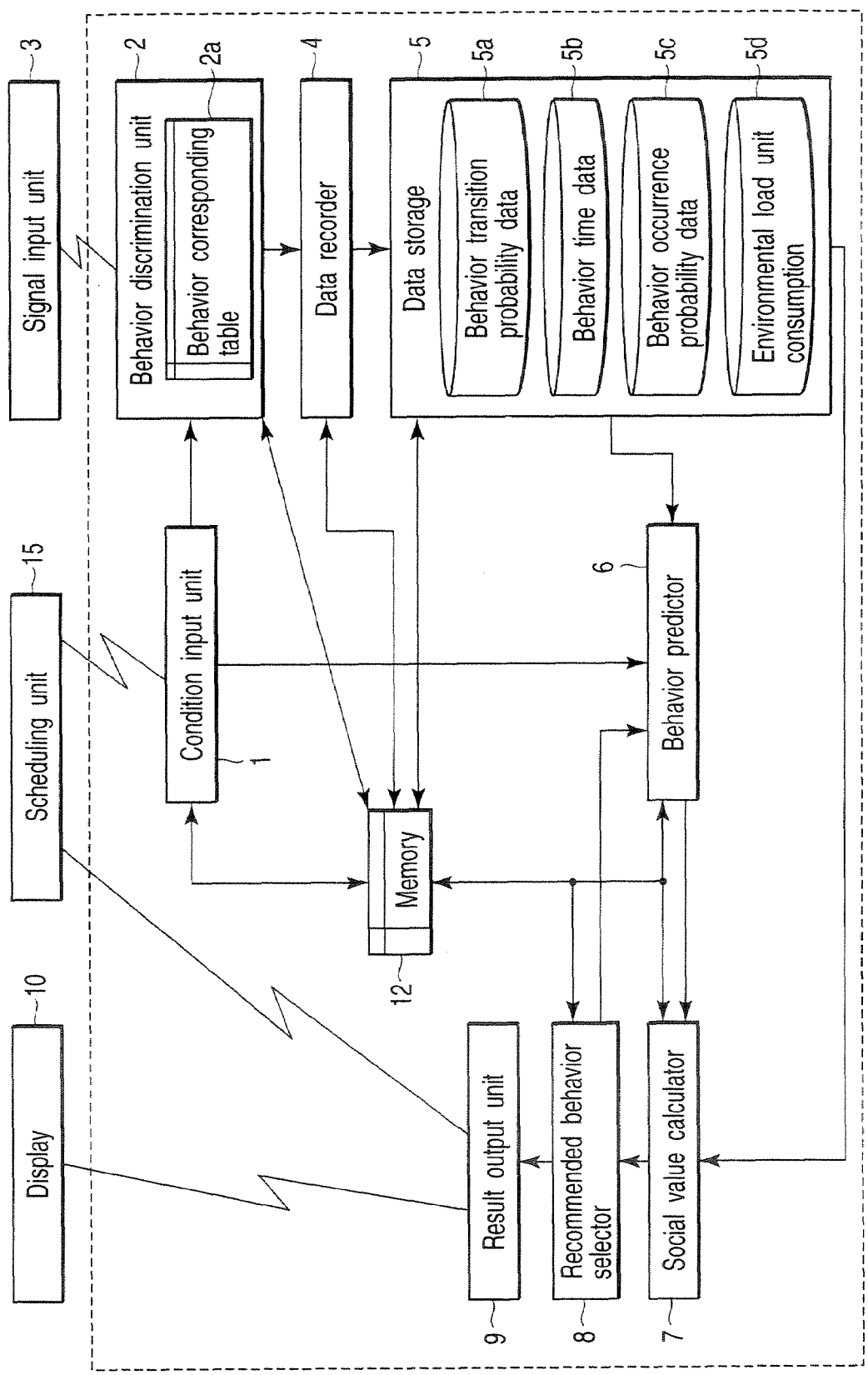
F I G. 24

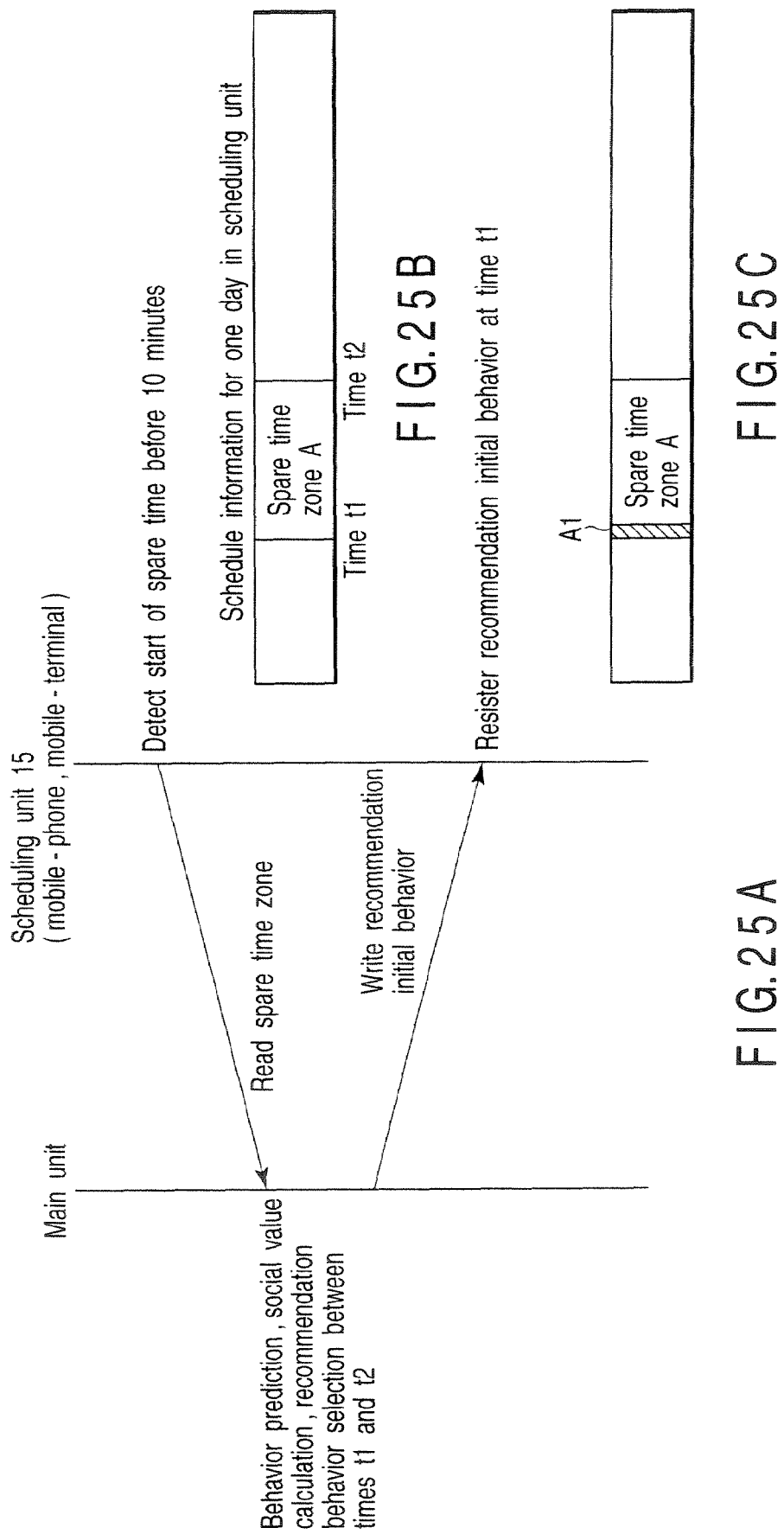

| No. | Action | Action items | Consumption calorie (cal / g / minutes) |
|---|---|---|---|
| 1 | Sleeping | | 0.016 |
| 2 | Personal errand | | 0.027 |
| 3 | Eating | | 0.025 |
| 19 | Learning / study (other than academics) | Other than English | 0.022 |
| 20 | Learning / study (other than academics) | Personal computer, etc. | 0.029 |
| 21 | Learning / study (other than academics) | Commercial practical business | 0.029 |
| 22 | Learning / study (other than academics) | Care relation | 0.094 |
| 23 | Learning / study (other than academics) | domestic economy / domestic affairs | 0.046 |
| 24 | Learning / study (other than academics) | humanity, social science, natural science | 0.022 |
| 25 | Learning / study (other than academics) | Art / culture | 0.022 |
| 26 | Learning / study (other than academics) | Other | 0.022 |
| 27 | Taste / entertainment | Spectator sports | 0.027 |

FIG. 26

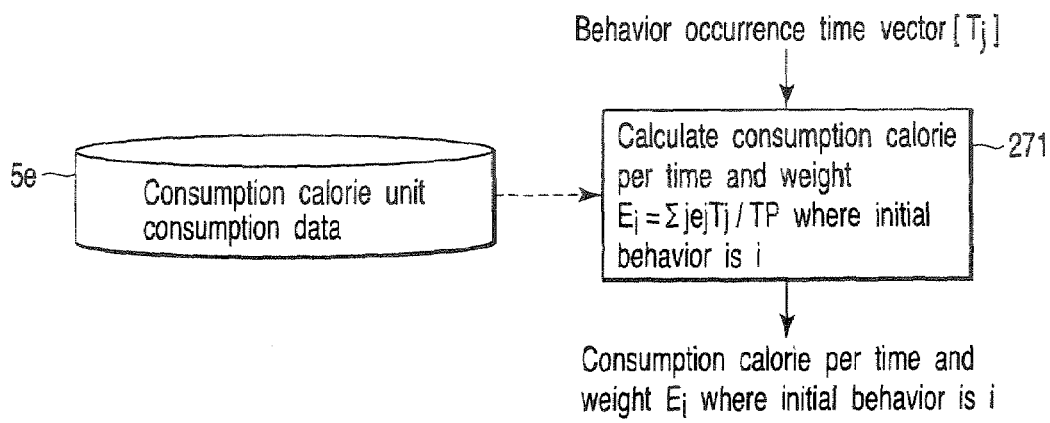

FIG. 27

| No. | Action | fit / person |
|---|---|---|
| 1 | Bathing | 1.958 |
| 2 | Cooking | 5.773 |
| 3 | Eating | 1.831 |
| 20 | Moving ( stairs ) | 3.408 |
| 21 | Television , radio , news paper , magazine | 0.509 |
| 22 | Wash | 0.229 |

BEHAVIOR PREDICTION APPARATUS AND METHOD THEREFOR

CROSS-REFERENCE TO RELATED APPLICATIONS

This application is based upon and claims the benefit of priority from prior Japanese Patent Application No. 2006-068277, filed Mar. 13, 2006, the entire contents of which are incorporated herein by reference.

BACKGROUND OF THE INVENTION

1. Field of the Invention

The present invention relates to a behavior prediction apparatus in consideration of a social value and a method for the same.

2. Description of the Related Art

Recently, global environment problems attract attention. In such circumstances, each company is expected to develop and provide products and services having lower environmental loads and higher social values.

When the people purchase and use the effective product and service that these companies provide, they may have spare times. If the people do a new behavior in the spare time, the unexpected environmental load that seems to exceed the environmental load reduced by the new product and service may occur. Such a situation is referred to as a rebound effect.

Accordingly, it is important to reduce not only the direct environmental load of the product and service, but also the environmental load including a behavior occurred newly or not to increase them in order to reduce the environmental load and enhance the social value throughout the entire society.

In addition, in order for various measures for reducing such an environmental load to be considered, it is necessary to predict beforehand what behavior is done in an unscheduled spare time. In this behavior prediction, since there is a difference in a sequence of behaviors occurring due to circumstances that the spare time occurs, personal preference or habit, such a factor must be considered.

A life cycle assessment (LCA) prescribed in ISO 14040 is known as a method of evaluating the whole product life cycle from a step of mining for the materials necessary for manufacturing products to a step of disposing used products in a viewpoint of the environmental load. In this LCA, the product life cycle is expressed as an evaluation scenario and evaluated. This evaluation scenario includes user information such as frequency in use as well as maker information such as material composition of a product.

However, LCA cannot evaluate the product life cycle without the scenario. Further, it has no method for creating a scenario concerning a rebound effect.

On the other hand, JP-A 2005-327134 (KOKAI) discloses an apparatus for detecting an abnormal situation of a human in a house. This apparatus accumulates behavior patterns of a senior as transition probability to detect behavior abnormality of the senior at home, for example. The apparatus comprises a region sensor to sense a human existing region, a behavior sensor to label the behavior of a human automatically using movement of a human body and a duration thereof, a calculator to calculate transition between regions and behavior transition in the regions, a data storage, and an abnormal determination unit. The abnormal determination unit compares each of a behavior transition in a region in every time zone, a transition between regions every time zone and a staying time in the region with each of normal ones to determine an abnormality from the result of comparison.

JP-A 2002-352352 (KOKAI) discloses an apparatus of detecting abnormality of a human living behavior pattern, comprising an existence detection unit, an behavior detection unit and a behavior estimation unit, wherein an operation sensing signal can be used as an ON/OFF signal of home electric appliances. The abnormal determination unit comprises an existence detection unit, an operation detection unit and a behavior estimation unit, and determines abnormality by obtaining deviance between the output produced from each unit by ON/OFF of the home electric appliance and statistical data and goodness-of-fit therebetween.

The IEEJ Trans. E, Vol. 125, No. 6, 2005, pp. 256-264 discloses an apparatus of detecting abnormal situation of a senior at home, comprising a behavior sensor, a region sensor, a behavior pattern calculator, a data storage and an abnormality determination unit. The behavior pattern of the senior is learned from hidden Markov model based on information provided from the behavior sensor and the region sensor. The abnormal determination unit determines whether or not the behavior of the senior is daily by calculating similarity between a behavior pattern and a predictive pattern.

The above related arts relate to a technique for determining whether or not the current behavior of a human is an abnormality behavior, and do not consider at all to predict a behavior considering a future social worth under a certain circumstance, or to recommend and guide a behavior.

BRIEF SUMMARY OF THE INVENTION

An aspect of the present invention provides a behavior prediction apparatus comprising: an input unit configured to input sole behaviors of a human and simultaneous occurrence probability of the behaviors; a behavior discrimination unit configured to specify a behavior pattern based on correspondence between behavior patterns including the behaviors corresponding to the simultaneous occurrence probability and input behavior patterns corresponding to actual behaviors of the human; an information generation/recording unit configured to generate behavior history information of the specified behavior pattern within a constant period, and to generate and record information of each of a behavior transition probability of changing from one behavior to another behavior, a behavior time during which the behavior is done and a behavior occurrence probability, for each of the behavior patterns, based on the behavior history information; a behavior prediction unit configured to obtain a starting behavior from the information of the behavior occurrence probability for a prediction period, select another behavior pattern for the starting behavior in order of the behavior occurrence probability based on the information of the behavior occurrence probability, and add the information of the behavior time to the selected behavior pattern to output behavior prediction information corresponding to the prediction period; and a social value calculation unit configured to obtain a social value per unit time, which is due to selection of the starting behavior, using the behavior prediction information, social value unit information prepared for beforehand and the prediction period.

BRIEF DESCRIPTION OF THE SEVERAL VIEWS OF THE DRAWING

FIG. 4 is a diagram of explaining an input of simultaneous occurrence condition and development to a possibility matrix according to the first embodiment.

FIG. 5 is a diagram of explaining a behavior table used for the first embodiment.

FIG. 9 is a diagram showing the number-of-behavior transition times data generated by a data recording unit used for the first embodiment.

FIG. 10 is a diagram showing behavior transition probability data generated by a data recording unit used for the first embodiment.

FIG. 15 is a diagram showing an environmental load unit consumption database stored by an environmental load unit consumption data storage unit used for the first embodiment.

FIG. 21 is a schematic diagram of a behavior prediction apparatus according to the third enforcement.

FIG. 24 is a schematic diagram of a behavior prediction apparatus according to a fourth embodiment.

FIG. 25A is a diagram of explaining a flow of cooperative processing of the fourth embodiment.

FIGS. 25B and 25C are diagrams showing schedule information.

FIG. 26 is a diagram showing a consumption calorie unit consumption database stored in a consumption calorie unit consumption data storage used for a sixth embodiment.

FIG. 27 is a flow chart explaining a social value computation process of a social value calculation unit used for the sixth embodiment.

DETAILED DESCRIPTION OF THE INVENTION

There will now be described embodiments in accordance with accompanying drawings hereinafter.

Figure 1:
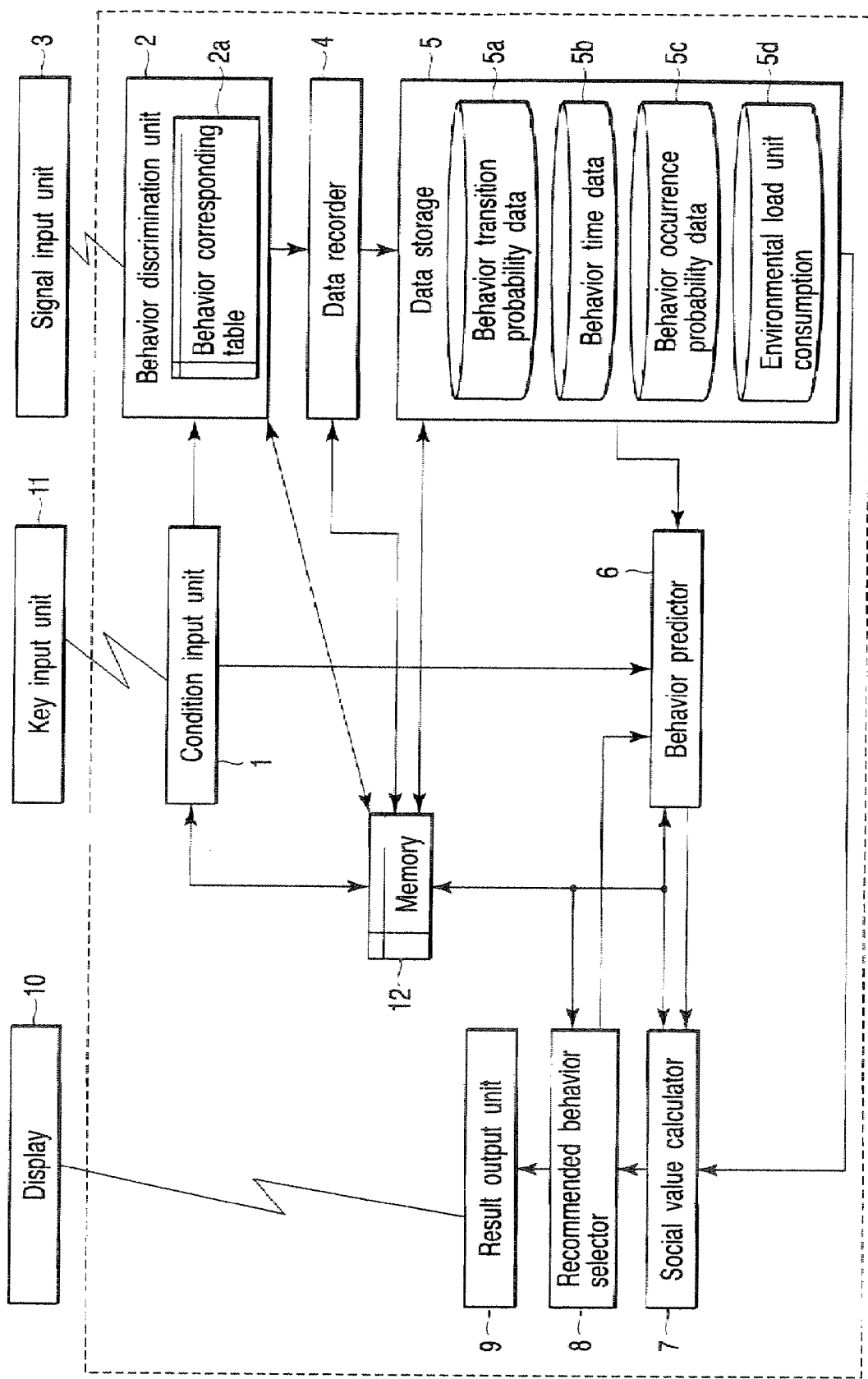
FIG. 1 is a schematic diagram of a behavior prediction apparatus according to a first embodiment.

According to an embodiment shown in FIG. 1, a behavior prediction apparatus comprises a condition input unit 1, a behavior discrimination unit 2, a signal input unit 3, a data recorder 4, a data storage unit 5, a behavior predictor 6, a society value calculator 7, a recommendation behavior selector 8, a result output unit 9, a display 10, a key input unit 11 and a memory 12.

Figure 2A:
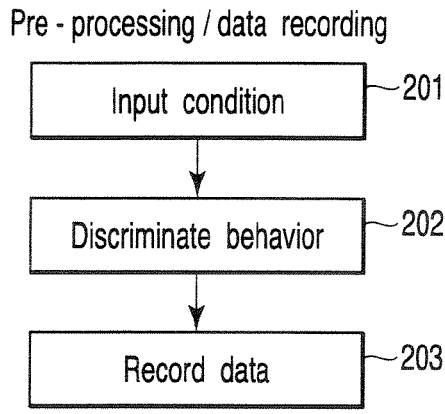
FIGS. 2A and 2B are flowcharts for explaining a preprocessing/data recording process and a behavior prediction/recommendation process according to the first embodiment.
Figure 2B:
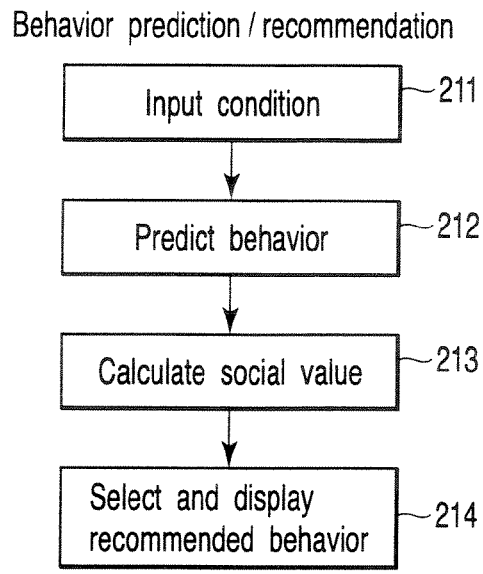

This behavior prediction apparatus executes preprocessing/data recording shown in FIG. 2A and a behavior prediction/recommendation process shown in FIG. 2B. According to the preprocessing/data recording shown in FIG. 2A, a condition before data recording is input in step 201.

Figure 3:
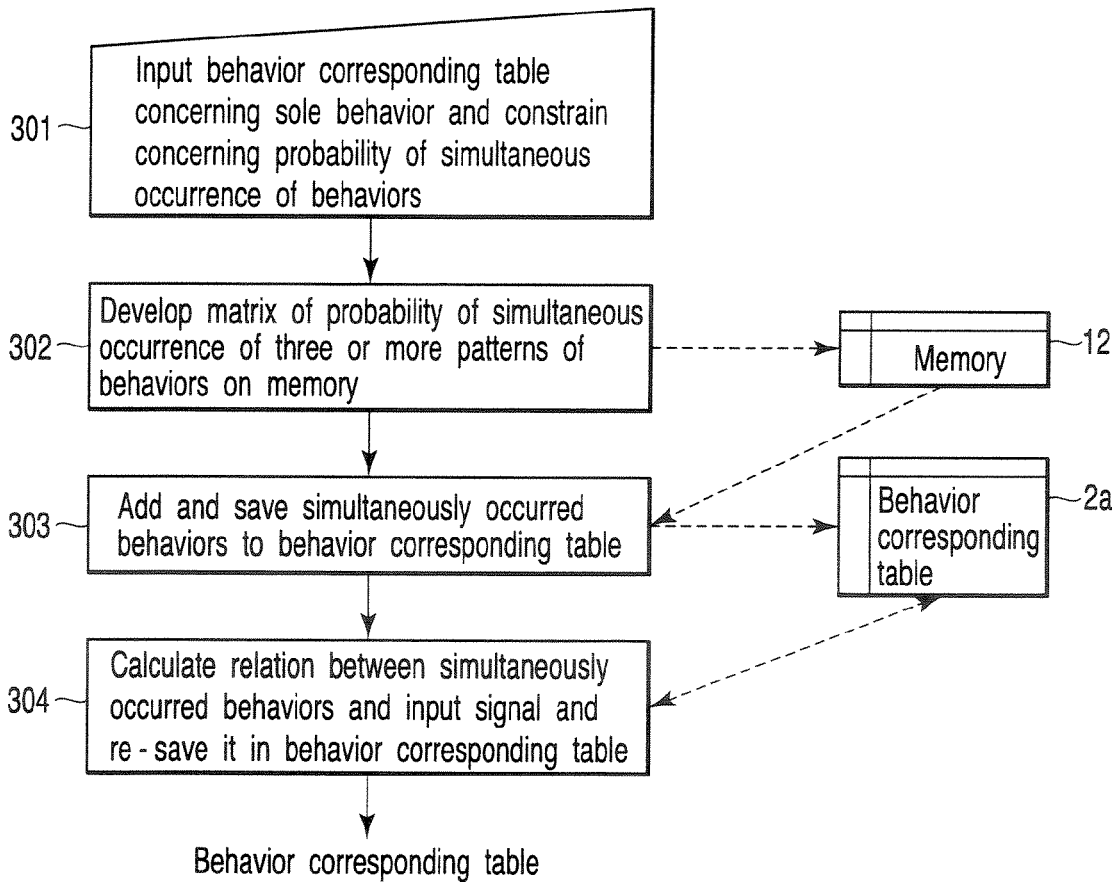
FIG. 3 is a flow chart for explaining a condition input process of a condition input unit according to the first embodiment.

The condition input process will be described referring to FIG. 3. At first, a constrain relating to simultaneous occurrence probability of behaviors is input for creating a behavior corresponding table concerning a sole behavior (step 301). In this case, the condition input unit 1 inputs behaviors that an object person can take solely and simultaneous occurrence probability of these behaviors, using the key input unit 11.

Referring to FIG. 4, the input of simultaneous occurrence condition and development to a simultaneous occurrence probability matrix will be described. As for a simultaneous occurrence probability matrix S1, the sole behavior of the object person, a physical constraint concerning the simultaneous occurrence behaviors and condition such as personal taste/custom are input in a form of triangular matrix. The physical constraint is a case that since instruments to be used in an actual behavior are separated in distance, they cannot be operated at the same time physically. The condition such as personal taste/custom is a case that the behaviors do not occur at the same time intentionally (for example, a person does not watch television while eating).

In the simultaneous occurrence probability matrix S1, since the sole behaviors that the object person can take are input to the row and column of the matrix, the data capable of occurring at the same time and corresponding to the physical constraint and the condition such as personal taste/custom are input at intersection points of row and column of the simultaneous occurrence probability matrix S1. For example, "1" data is input between behavior patterns capable of being occurred at the same time or behavior patterns that want to be occurred at the same time, and "0" data is input between behavior patterns incapable of being occurred at the same time.

According to an example directed to behaviors at home as shown in FIG. 4 (A), the television watching can do with one of cooking, dryer use, eating, dressing and tableware washing at the same time, and thus "1" data is input. Similarly, since radio listening can do with one of cooking, eating and tableware washing at the same time, "1" data is input.

The condition on the simultaneous occurrence behaviors is input through the condition input unit 1 from the key input unit 11, and added as behavior patterns with simultaneous occurrence probability to a behavior corresponding table 2a described hereinafter. In addition, if there are desired simultaneous occurrence behaviors to be brought in beforehand, they may be registered on the simultaneous occurrence probability matrix S1 as simultaneous occurrence probability without relation to the personal taste/custom.

A simultaneous occurrence probability matrix S2 of three or more sole behavior patterns is developed to the memory 12 (step 302). In this case, the simultaneous occurrence probability matrix S1 shown in FIG. 4 (A) is developed to the simultaneous occurrence probability matrix S2 shown in FIG. 4 (B) using a method described hereinafter.

At first, sets of the simultaneous occurrence behaviors indicated by data "1" input to the simultaneous occurrence probability matrix S1 are added to the row of the simultaneous occurrence probability matrix S2. In this example, there are prepared a set of television watching and cooking, a set of television watching and dryer, a set of television watching and eating, a set of television watching and tableware washing, a set of cooking and radio listening, a set of eating and radio listening, a set of tableware washing and radio listening.

The condition input unit 1 detects sole behaviors configuring simultaneous occurrence behaviors and correspondence between the simultaneous occurrence behaviors, and inputs a value of "0" to the correspondence. Further, remaining correspondence, namely, simultaneous occurrence probability of three kinds of different behaviors is calculated as a logical product of simultaneous occurrence probabilities of sole behaviors configuring the simultaneous occurrence behaviors and a new behavior. For example, the simultaneous occurrence probability of [television watching & cooking] and dryer use shown in FIG. 4 (B) is calculated as a logical product "0" of simultaneous occurrence probabilities "1" and "0" of the set of television watching and dryer use and the set of cooking and dryer use shown in FIG. 4 (A). In this time, the same value ("0" or "1") is input to the simultaneous occurrence probability of the same combination as the calculated combination of behaviors shown in FIG. 4 (B).

In repeating the similar calculation, the simultaneous occurrence probability matrix S2 including three or more kinds of simultaneous occurrence behaviors is developed from the simultaneous occurrence probability matrix S1. After development is completed in this way, all behaviors (including simultaneous occurrence behaviors) written in the row of the simultaneous occurrence probability matrix S2 is added to the behavior correspondence table 2a (step 303).

Correspondence of the added behavior patterns (including simultaneous occurrence behaviors) with an input signal to be described below is calculated, and saved in the behavior correspondence table 2a again (step 304). The input signals used here include detection signals of various sensors and operation situation signals of various devices. The various sensors may be, for example, position sensors detecting the existence position of the object person such as an acceleration sensor, a voice sensor for measuring the strength and weakness/pitch/duration of a voice, infrared sensor, pyroelectricity type sensor, GPS, RF-ID (Radio Frequency Identification).

The kinds of equipment are a refrigerator, an electric pot, a television set, a water service faucet, etc. The sense signals of these sensors and operation situation signals of the equipment are collected by the suitable number of sampling times, and the average, dispersion value, maximum of the signals are used. These input signals are taken in the apparatus through the signal input unit 3.

The behavior correspondence table 2a of FIG. 5 represents correspondence between the behavior pattern that the object person can take and the input signal input from the signal input unit 3. In this case, the behavior correspondence table 2a comprises behavior patterns (including simultaneous occurrence behaviors) written in from the simultaneous occurrence probability matrix S2 and type of the input signal, that is, input type associated with the actual behavior of the object person (existence of the person in a living room, a kitchen, etc., and on/off of equipment such as an illumination, a refrigerator). It is determined by presence or absence of the input signal whether the object person is in each room. If the object person is in the room for a certain behavior, "1" is written in the table, and if he or her is not in the room, "0" is written therein.

The use condition of equipment also is determined in presence of the input signal, and a state code is written in the table. In this example, if the use condition is true, "1" is written in the table, and it is false, "0" is written therein. In the illustrated example, in the case that the behavior is "television watching", assuming that the object person is in a living room and the television switch is ON, "1" indicating that the object person is in the living room is written in the table, and at the same time, "1" indicating ON of the television set is written therein.

If the input signal is quantitative data, the range thereof is written in the table. In the illustrated example, the average voice level emitted by the object person, average vertical direction acceleration, horizontal direction acceleration dispersion value representing movement of the object person, etc. are written in the table as the range.

Determination of simultaneous occurrence behaviors is included in the behavior correspondence table 2a shown in FIG. 5, too. In this case, correspondence between the sole behavior and the input signal is based on data input beforehand. However, by logical sum calculation of input signals in the case of the sole behavior or by setting a range of the bound pair of numerical values at a wider range, a signal input condition corresponding to arbitrary simultaneous occurrence behaviors can be derived and embedded in the behavior correspondence table 2a. For example, when the television watching and dryer use are occurred at the same time in FIG. 5, a signal input condition of this time is generated by making a condition encompassing both of signal input conditions in those sole behaviors. Using such behavior correspondence table 2a, such abnormal behavior as to forgot to turn off illumination can be determined. A plurality of object persons can be determined, for example, who of family do what behavior by giving an identification code to the object person and adding the identification code to an input signal.

The behavior determination of step 202 shown in FIG. 2 is executed. The process of behavior discrimination is done with the behavior discrimination unit 2 shown in FIG. 6. In this case, the behavior discrimination unit 2 specifies a behavior pattern from a value (1 (truth), 0 (false)) of an input signal input from the signal input unit 3 or a quantitative value and combination of these input signals, based on the behavior correspondence table 2a in step 601, and outputs it to the memory 12.

Subsequently, data recording is executed in step 203 shown in FIG. 2A. The data recording process executed with the data recorder 4 will be described referring to FIG. 7. At first the data recoder 4 sets a behavior pattern specified by the behavior discrimination unit 2, month and date, week and time data, generates behavior history data (behavior history information) at a constant time interval decided beforehand, and saves it in the memory 12 temporarily (step 701).

Figures 6, 8:
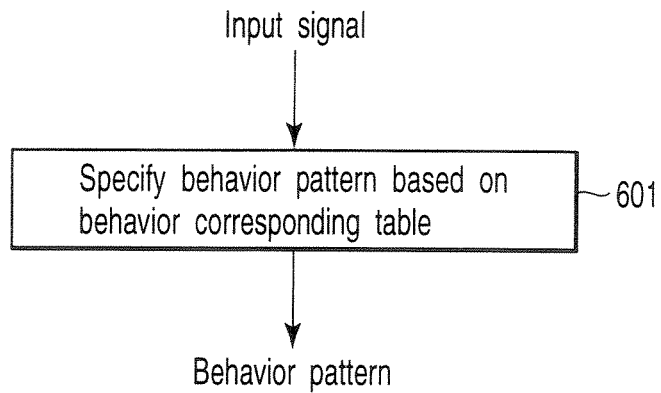
FIG. 6 is a flow chart of explaining a behavior distinction process of a behavior determination unit used for the first embodiment.
FIG. 8 is a diagram showing behavior history data made by a behavior determination unit used for the first embodiment.

FIG. 8 shows behavior history data generated every 5 minutes from 9:00 to 9:30 on Feb. 4, Sunday. A behavior transition probability, behavior transition time and behavior occurrence time are calculated, respectively, at a constant time interval (step 702).

In this case, if a predetermined constant time interval lapses, the number of times that the behavior changes from a behavior i per a time zone to a behavior j is counted using the behavior history data saved in the memory 12 in the interval.

FIG. 9 shows the number of behavior transition times. It is assumed that there are N behavior patterns where i, j=1, ... N. If a behavior pattern is, for example, "cooking", the number of times by which the behavior changes from the behavior i to the behavior j in a time zone from 8:00 to 10:00 is counted as one time when it changes to "eating". The behavior transition probability Aij that the behavior changes from the behavior i to the behavior j is calculated by dividing each parameter (the number of behavior transition times) of FIG. 9 by the total number of transition times every starting behavior i.

FIG. 10 shows the calculated result of behavior transition probability. When the behavior pattern is "cooking", the number of behavior transition times is 1. When this is divided by the total number of transition times, "1" is obtained. This behavior transition probability $A_{ij}$ is stored in the behavior transition probability data memory 5a of the data storage 5 as a transition matrix $[A_{ij}]$. In this case, $\sigma_j A_{ij}=1$. The simultaneous occurrence behavior is treated as one behavior i or j.

Figure 11:
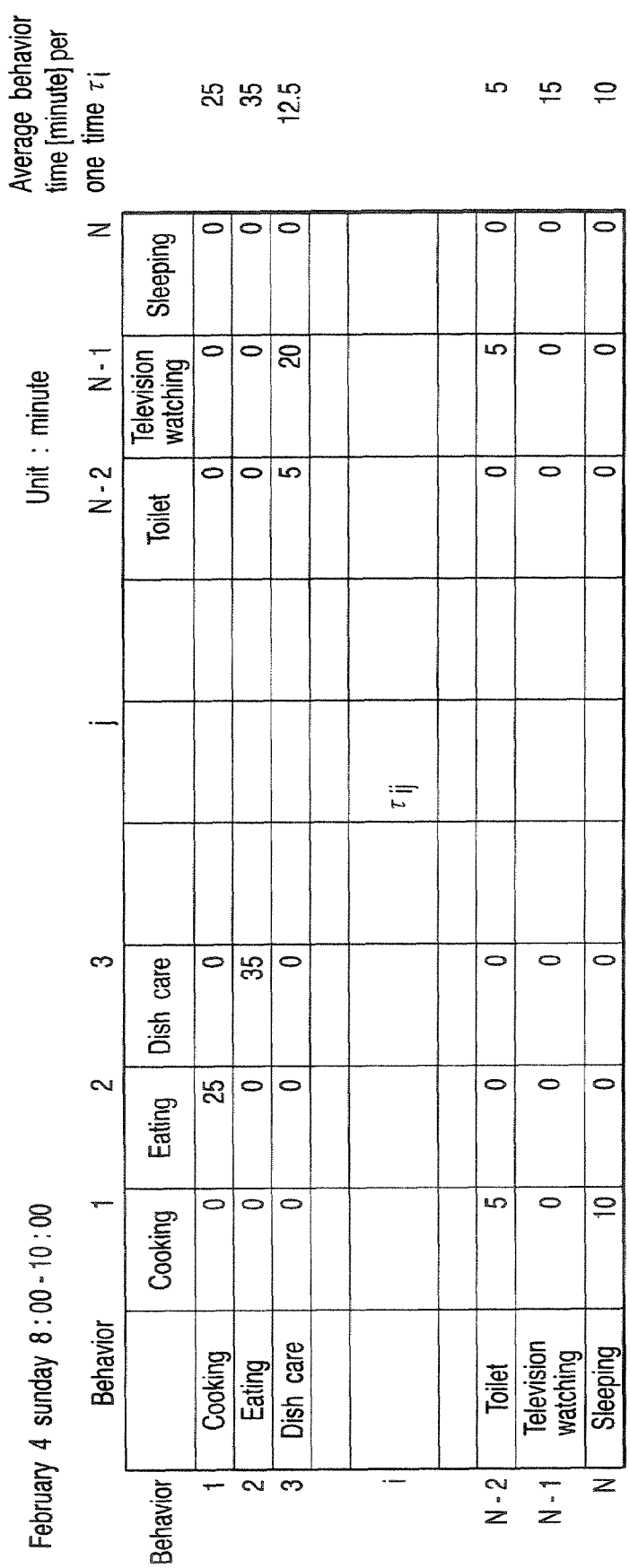
FIG. 11 is a diagram showing behavior time data generated by a data recording unit used for the first embodiment.

The behavior time $\tau_{ij}$ between which the behavior changes from the behavior i to the behavior j is measured from an interval of behavior change. For example, a time during which the behavior changes from the behavior i (cooking) to the behavior j (eating) is assumed to be 25 minutes as shown in FIG. 11, this time becomes a time τij needed for cooking. This behavior time $\tau_{ij}$ is calculated from the behavior history data. The average behavior time $\tau_i$ per once of behavior i is calculated using this behavior time $\tau_{ij}$ and the behavior transition probability $A_{ij}$ by the following equation.

$$t_i = \Sigma j A_{ij} t_{ij}$$

The average behavior time $t_i$ per once in a certain time zone that is calculated in this way is recorded in the behavior time data memory 5b of the data storage unit 5 as an average behavior time vector.

Figures 12, 13:
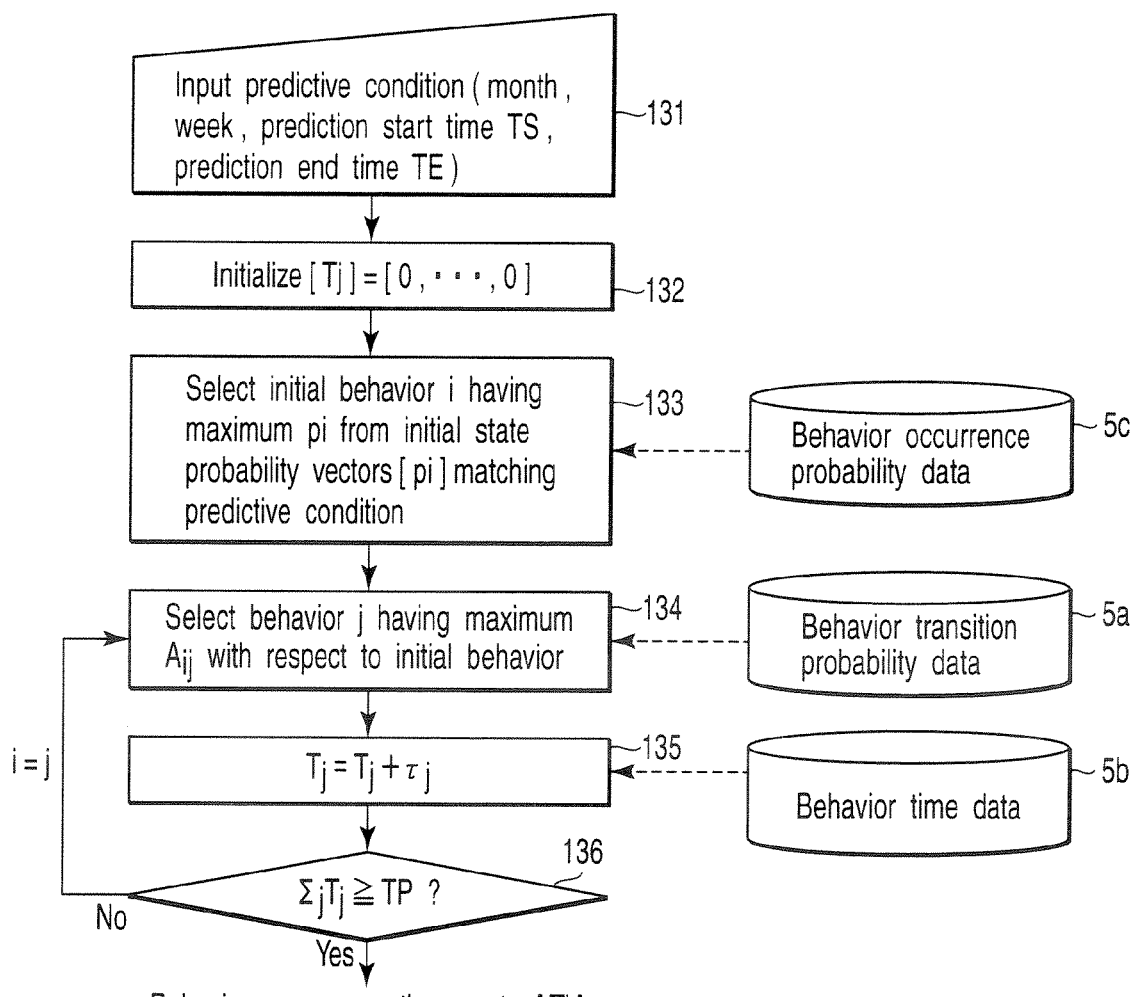
FIG. 12 is a diagram showing behavior outbreak probability data generated by a data recording unit used for the first embodiment.
FIG. 13 is a flow chart explaining a behavior prediction process of a behavior predictor used for the first embodiment.

The total occurrence time of each behavior i is measured every time zone, and divided by a period of the time zone to calculate a behavior occurrence probability. FIG. 12 shows the calculation result of the behavior occurrence probability. In the case of, for example, cooking, since the total occurrence time from 8:00 to 10:00 is 25 minutes (refer to FIG. 11), it is possible to obtain the behavior occurrence probability pi of 0.21 by dividing it by the time zone of 120 minutes. In this way, the calculated behavior occurrence probability is stored in the behavior occurrence probability data memory 5c of the data storage 5 as a behavior occurrence probability vector $[p_i]$.

Figure 7:
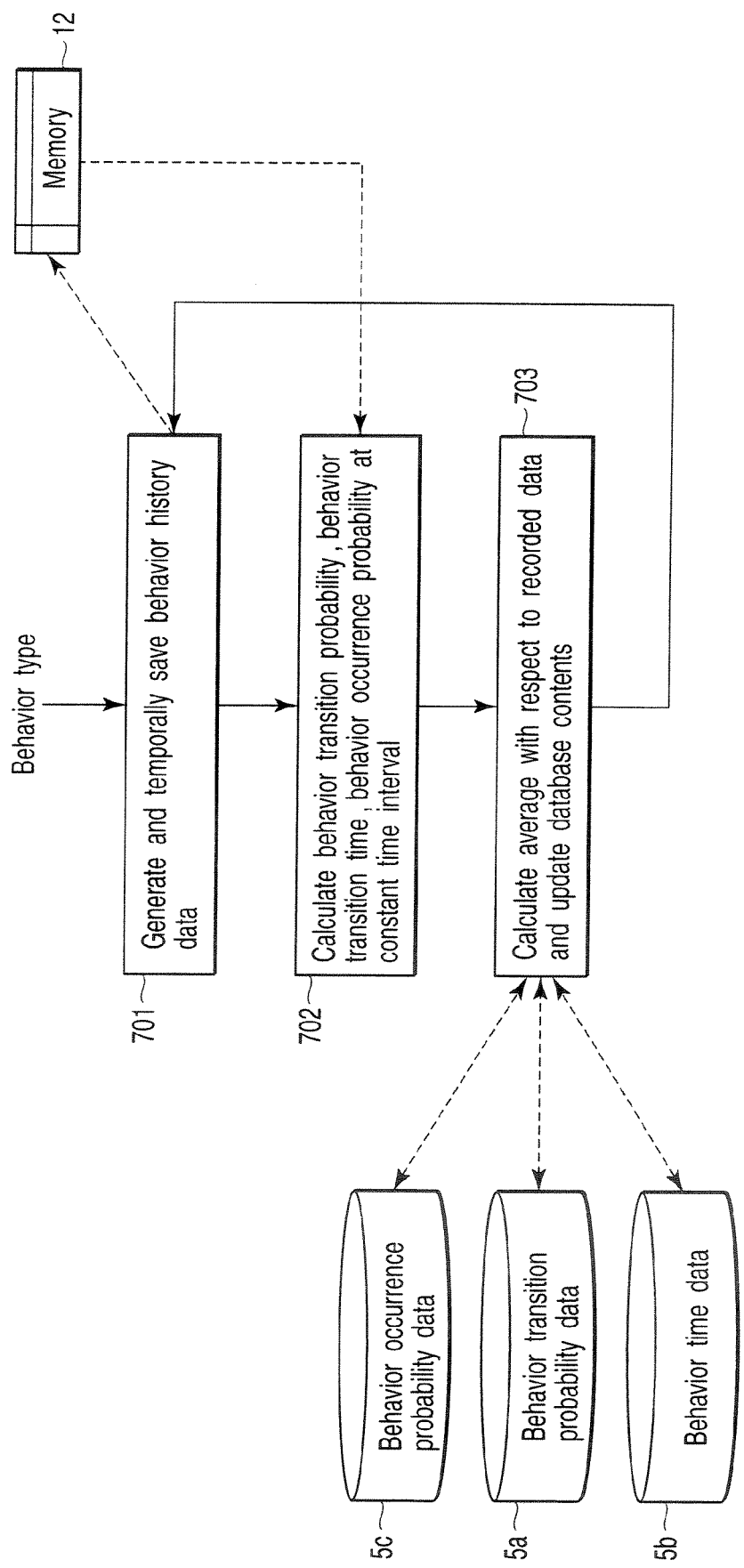
FIG. 7 is a flow chart of explaining a data recording process to a data storage used for the first embodiment.

The process advances to step 703 of FIG. 7 to calculate an average of each data stored in the data memory 5 and update the contents of the database. In this case, the data of each of the behavior transition probability data memory 5a, behavior time data memory 5b and behavior occurrence probability data memory 5c is divided into plural data in units of month/day, week and time zone. The stored past data are read out in these units, and an average of the readout past data and the new data is calculated. The average data is stored in each of the behavior transition probability data memory 5a, behavior time data memory 5b and behavior occurrence probability data memory 5c of the data storage 5 again. Thereafter, the behavior prediction/recommendation process is executed as shown in FIG. 2B.

In this behavior prediction/recommendation process, at first, a condition is input in step 211. The behavior prediction process is executed based on the condition input as shown in FIG. 13. At first, the object person oneself inputs a spare time as a prediction period (gap time) with the key input unit 11. This prediction period (gap time) is a period for predicting a behavior of the object person during the spare time, and is input a behavior prediction start and behavior prediction end to the condition input unit 1 as a behavior prediction condition. Concretely, the object person inputs the month, week, prediction start time TS, prediction end time TE, identification information of the object person to the condition input unit 1 (step 131). The behavior prediction end time may be always the end of a day, that is, 0:00 without setting it in particular.

Subsequently, the behavior prediction is executed in step 212 shown in FIG. 2B. In this case, the behavior prediction condition input to the condition input unit 1 is given to the behavior predictor 6. The behavior predictor 6 generates a behavior pattern j occurring according to the behavior prediction condition input from the condition input unit 1 and a behavior occurrence time vector $[T_j]$ representing the occurrence time $T_j$. In this time, the behavior occurrence time vector $[T_j]$ is initialized (step 132).

A behavior occurrence probability vector [pi] corresponding to the prediction start time point is read as an initial state provability from the behavior occurrence probability data memory 5c. The behavior of the highest occurrence probability in the past data corresponding to the month, week, prediction start time TS, prediction end time TE given as the behavior prediction condition, that is, the behavior of the highest initial state probability pi is selected as a starting behavior i (step 133). The starting behavior intends a behavior to be executed after start of the behavior prediction first, and is "eating" in the example of FIG. 12.

The most frequency path on this starting behavior i is calculated. The mode path means a chain of the behaviors to be changed at the highest probability subsequently. In this case, the behavior j to change from a certain behavior i at the maximum probability $A_{ij}$ is selected using the transition matrix $[A_{ij}]$ stored in the behavior transition probability data memory 5a (step 134).

An average behavior time $t_j$ on the behavior j is added to an item $T_j$ of the behavior pattern corresponding to the behavior occurrence vector using the average behavior time vector $[t_i]$ stored in the behavior time data memory 5b (step 135).

If the total time $\Sigma_j T_j$ of a sequence of behaviors reaches a prediction period TP (=prediction end time TE−prediction start time TS) by the addition process, the chain calculation is stopped and an occurrence time vector $[T_i]$ every behavior is output as behavior prediction information (step 136).

If the total time $\Sigma_j T_j$ does not reach the prediction period TP, the process of selection of behavior and addition of behavior occurrence time are repeated till the total time reaches the prediction period TP by the starting behavior is replaced with j. In this case, if the number of occurrence times of a certain specific behavior reaches the number of specified times set beforehand, the behavior pattern can be removed from the prediction behavior system. For example, "eating takes three meals a day" is set. In this time, even if the prediction behavior system including the eating taking four or more meals is calculated, this can be realized by adding to the flow of FIG. 13 a process of ignoring a behavior changing to the "eating" behavior in the sequence of behaviors on and after the fourth behavior.

Figure 14:
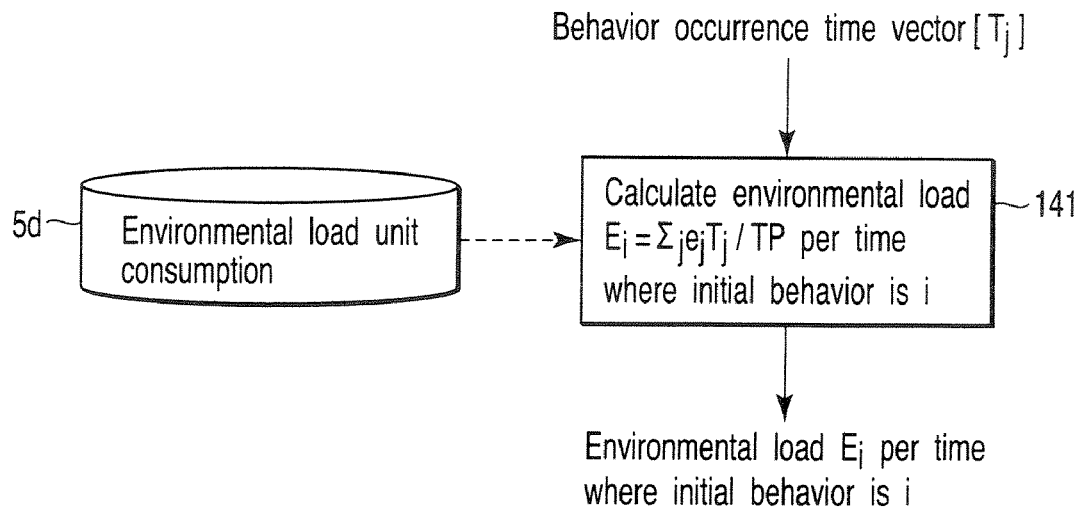
FIG. 14 is a flow chart explaining a social value computation process of a social value calculation part used for the first embodiment.

A social value calculation is executed in step 213 shown in FIG. 2B. FIG. 14 shows a process of the social value calculation executed with the social value calculator 7. In this case, the occurrence time vector Tj of the behavior j calculated with the behavior predictor 6 is multiplied by the environmental load unit consumption data ej (social value unit information) read from the environmental load unit consumption data memory 5d to calculate an environmental load due to the behavior j (step 141). The environmental load unit consumption data ej is, for example, emission quantity of environmental load of behavior j per time, for example, emission quantity of carbon dioxide. This is given from the environmental load unit consumption database shown in FIG. 15 and stored beforehand in the environmental load unit consumption data memory 5d, for example.

The environmental load unit consumption database includes "activity", "activity items" and "environmental load unit consumption". In the case of, for example, "eating" as "activity", "0.2893" is given as "environmental load unit consumption". The environmental load is a negative social value. The activity can be assumed to be a behavior that the social value decreases with increase of the negative social value.

The sum total of environmental loads of all behaviors is calculated, and divided by the prediction period TP (=prediction end time TE−prediction start time TS) to output a total value Ei (social value information) of emission environment load due to selection of the starting behavior i per unit time.

Figure 16:
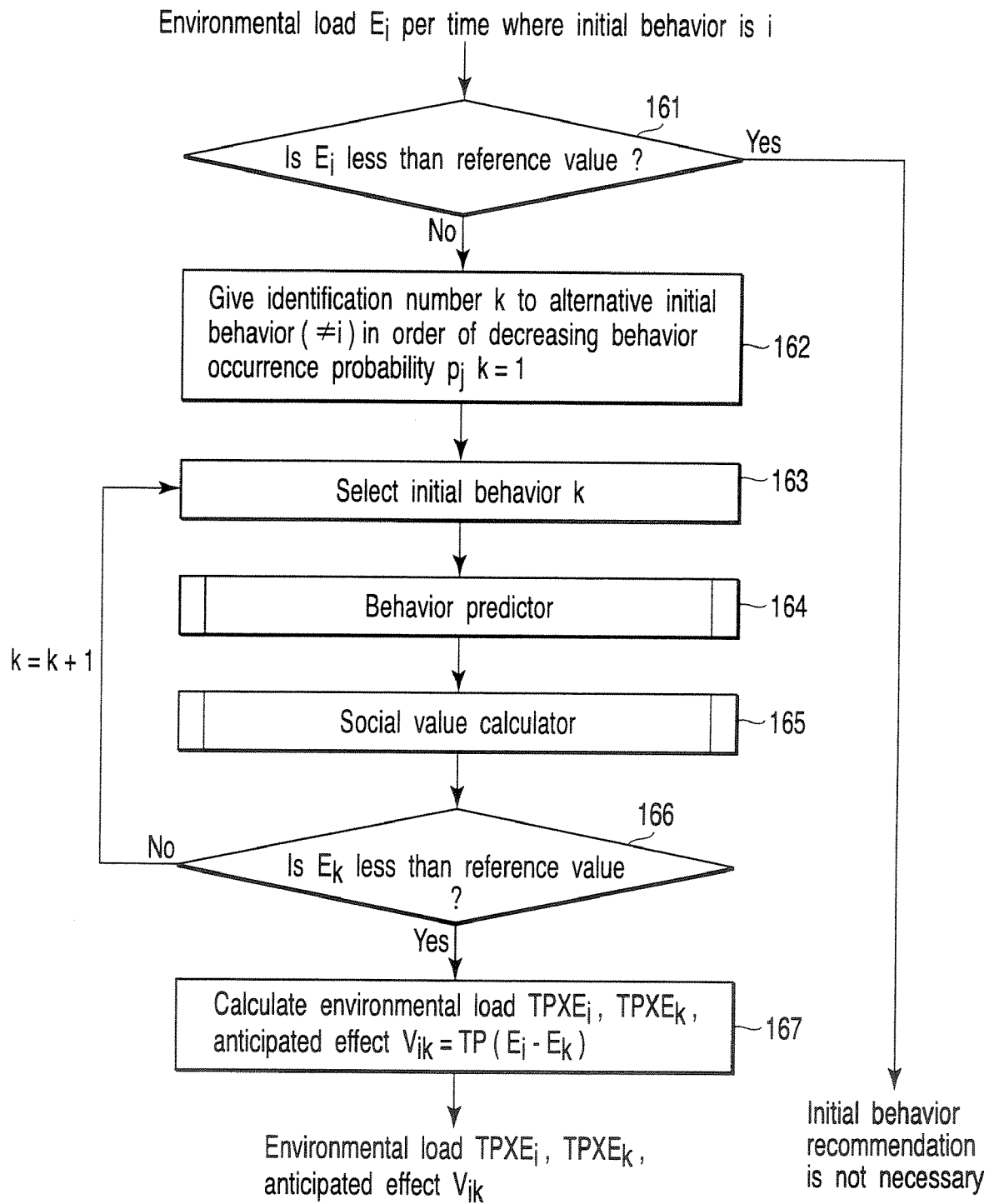
FIG. 16 is a flow chart explaining a recommended behavior selection process of a recommended behavior selector used for the first embodiment.

Recommendation behavior selection/display is executed in step 214 shown in FIG. 2B. FIG. 16 shows a process of selecting the recommended behavior with the recommended behavior selector 8. It is determined whether the environment load Ei per time in the sequence of behaviors whose starting behavior is assumed to be i is not more than a reference value. In this example, the reference value uses emission quantity of carbon dioxide [$CO_2$-kg/hour] which is converted from an average use energy amount per time and per nation. An arbitrary reference value other than the above value may be set.

If it is determined in step 161 that the environmental load Ei is less than the reference value, the process is finished without selecting the recommended behavior. If the environmental load Ei is not less than the reference value, the process advances to step 162. In step 162, ID number k is updated in order of decreasing occurrence probability pj for behaviors aside from the starting behavior i, where k=1, . . . , N−1. The prediction of the behavior sequence is performed for the behavior of k=1 ("cooking" in the example of FIG. 12) with the behavior predictor 6 (step 163, 164), like the case of assuming "eating" to be the starting behavior as described above. The social value calculator 7 calculates an environment load Ek per time about a prediction behavior sequence, and returns the result to the recommend ion behavior selector 8 (step 165).

If this environmental load Ek is not less than the reference value (step 166), the starting behavior is updated to k=k+1, and then the process returns to step 163. The above process is repeated until the environmental load Ek becomes less than the reference value.

A difference Vik between the environment load sum total TP×Ek of the behavior sequence assuming that the behavior k obtained in this way is the starting point and the environment load sum total TP×Ei of the behavior sequence assuming that the behavior i is the starting point is calculated. This is deemed to be a social value improvement when the starting behavior is changed from the behavior i to the behavior k, and TP×Ek, TP×Eii, Vik are output (step 167).

The result output unit 9 converts Vik to a human-friendly form and outputs to the display 10. In other words, the result output unit 9 outputs the result to the display 10 in the form of "If the behavior k is selected instead of the behavior i, the social value surely improves by Vik", and outputs it by image, voice, etc.

Figure 17:
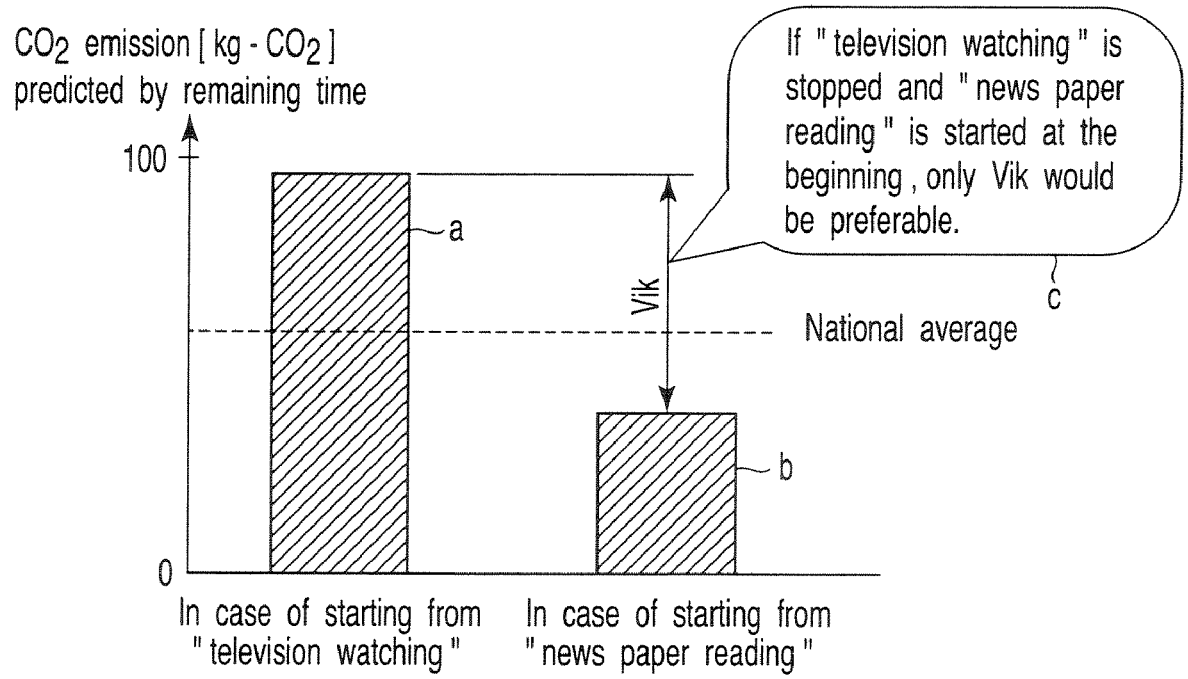
FIG. 17 is a diagram showing a screen display of the recommended behavior on a display unit used for the first embodiment.

FIG. 17 shows an example of displaying a recommendation behavior on the display 10. It is displayed that the case (b) of (starting from "news paper reading") is a recommendation behavior in comparison with the case (a) of ("starting from watching television"). The case (c) recommends the behavior by adding such a display that if "television watching" is stopped and "news paper reading" is started, only Vik would be preferable.

A negative society value produced by assuming that the behaviors i and k are the starting behavior may be directly output. When the recommendation behavior is unnecessary, a result is not output. The display 10 may be a voice output other than the visual output. The television which can be connected to a network may be used as the display.

According to the above embodiment, the behavior discrimination unit 2 specifies a behavior pattern based on correspondence between the behavior pattern acquired by the input of the sole behaviors of the object person input from the condition input unit 1 and the simultaneous occurrence probability of these behaviors and the input pattern of the actual behavior of the object person. The data recorder 4 forms behavior history data of a constant period about this specified behavior pattern. The data recorder 4 generates and records information of each of behavior transition probability, behavior time and behavior occurrence probability for each behavior pattern based on the history data.

The behavior predictor 6 predicts a starting behavior from the behavior occurrence probability information for a prediction period, and selects another behavior with respect to the starting behavior in order of behavior occurrence probability based on the behavior occurrence probability information. The behavior time information for these selected behaviors are added to output behavior prediction information corresponding to the prediction period. The society value calculator 7 calculates an environment load per unit time, which is due to selection of the starting behavior, from the behavior prediction information, the environmental load unit consumption information prepared for beforehand and the prediction period.

The environmental load per unit time obtained by the social value calculator 7 is compared with the reference value prepared with the recommendation behavior selector 8 beforehand. The result output unit 9 selects a recommendation behavior based on the comparison result and displays this selected recommendation behavior on the display 10. As a result, the behavior of a to-be-predicted person within a certain prediction period can be predicted and guided in a direction in which the social value increases, thereby to make it possible to reduce drastically a future environment load.

The to-be-predicted person can take a behavior of high social value to satisfy a reference value without receiving a psychological burden. Then, a starting behavior or behavior sequence of highest social value may not be always recommended by the reference value prepared with the recommended behavior selector 8 beforehand. Rather, it is possible to recommend a starting behavior that is easy to be accepted by a user while achieving a social value reference determined in average. Therefore, the possibility that the recommendation result is ignored becomes smaller than the case that behavior recommendation taken in consideration of only the social value merely is ignored. This means that a psychological burden of the to-be-predicted person against environmental consideration behavior, diet behavior, etc. is reduced.

Further, the starting behavior or simultaneous occurrence behavior that is not seemed to be a behavior of high social value at the first glance may be recommended. This is due to selecting the starting behavior by an average society value of a behavior sequence within a prediction period. Such a result is realized by really acquiring personal behavior history data, and using an apparatus as shown in the present embodiment.

Further, since the sole behavior of the object person that is input from the condition input unit 1 while considering preference of the object person and the simultaneous occurrence probability of these behaviors are input, it is possible to make easily environment that the object person can cause positively the behavior of high social value.

Second Embodiment

The second embodiment will be explained subsequently.

In this the second embodiment, If the society value may be improved by promoting change (disaggregation) from the simultaneous occurrence behavior to the sole behavior or change (aggregation) from the sole behavior to the simultaneous behavior, Such a change request is output from the display 10.

Since the behavior prediction apparatus of the second embodiment is similar to that of FIG. 1, the second embodiment will be described referred to FIG. 1.

Figure 18:
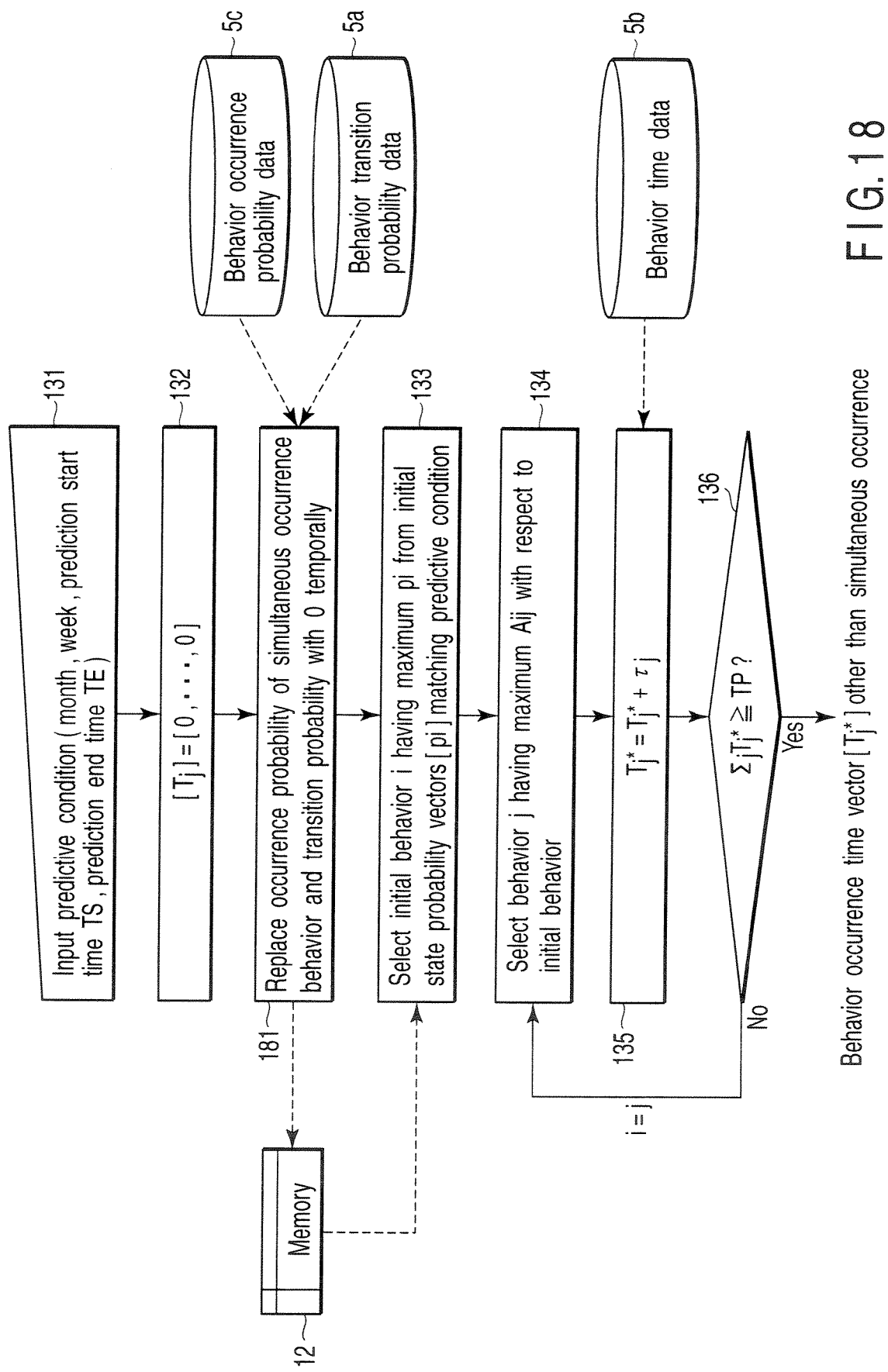
FIG. 18 is a flow chart explaining a behavior prediction process of a behavior predictor used for a second embodiment.

In FIG. 18, like reference numerals are used to designate like steps corresponding to those like in FIG. 13 and any further explanation is omitted for brevity's sake, but different steps will be described.

In step 181, the occurrence probability of the simultaneous occurrence behaviors from the behavior occurrence probability data memory 5c and probability, that the behavior is changed to the simultaneous occurrence behavior, from the behavior transition probability data memory 5a are replaced with 0 temporarily and saved in the memory 12. Like the process on and after step 133 executed by the behavior predictor 6 using these probability data, a behavior sequence aside from the simultaneous occurrence behavior is predicted, and the behavior occurrence time vector $[T_j^*]$ corresponding to a breakdown of the behavior time is output.

Figure 19:
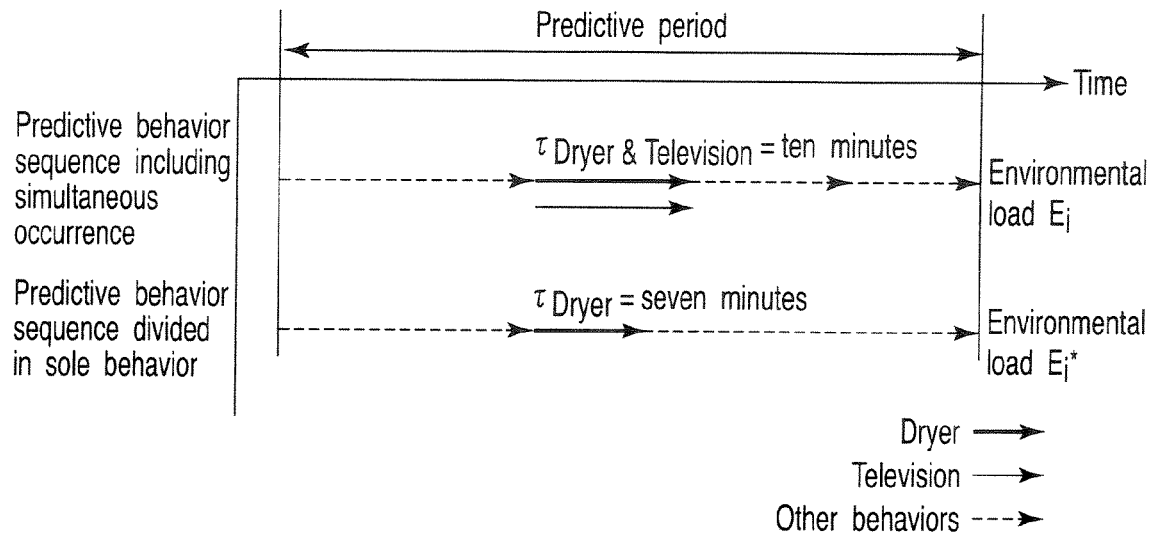
FIG. 19 is a diagram of explaining the second embodiment.

Environmental loads Ei and Ei* per time are calculated by the social value calculator 7 according to the process flow of FIG. 14, using $[T_j]$ including the simultaneous occurrence behavior and $[T_j^*]$ excluding the simultaneous occurrence behavior. According to an example of FIG. 19, the television watching and dryer use are simultaneous occurrence behaviors.

When the object person uses a dryer while watching a television, he or she takes 10 minutes in average. In the sole behavior of only use of the dryer, use of the dryer finishes with 7 minutes in average. Environmental loads in respective behavior sequences are calculated as $E_i$ and $E_i^*$.

Figure 20:
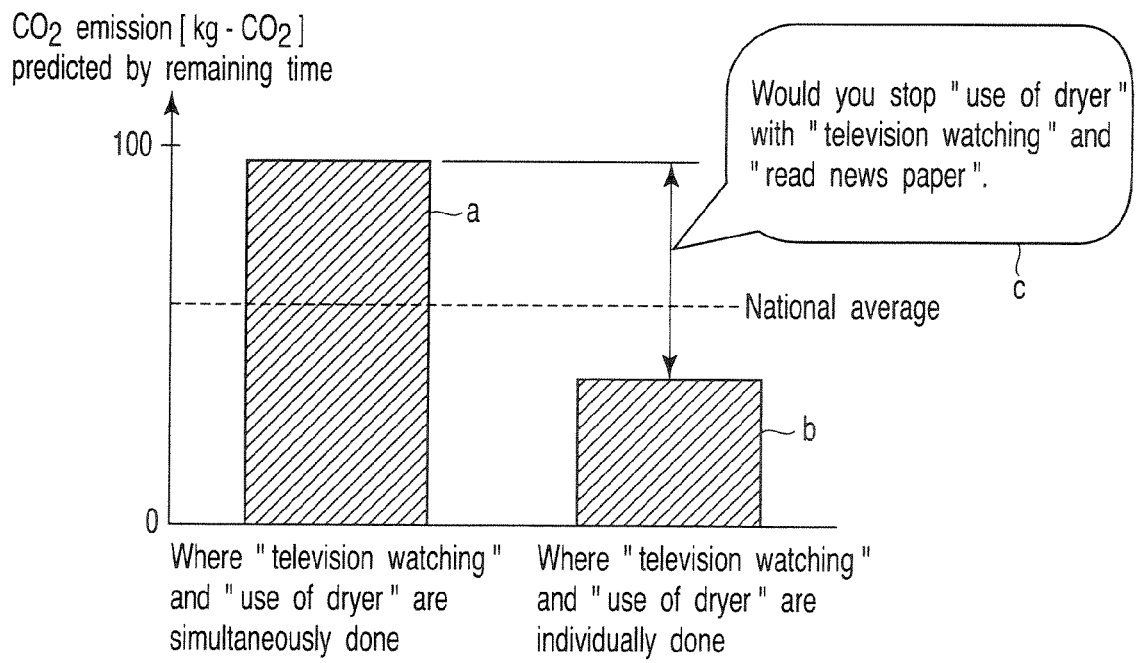
FIG. 20 is a diagram showing a screen display of recommended behavior on a display unit used for the second embodiment.

The recommendation behavior selector 8 determines whether $E_i > E_i^*$. If $E_i > E_i^*$, a result as shown in FIG. 20 is output to the display 10 from the result output unit 9. According to the display example of the display 10 as shown in FIG. 20, it is shown that a case (b) of carrying out "use of a dryer" and "television watching" separately is recommended in comparison with case (a) of carrying out "use of a dryer" and "television watching" at the same time. Further, a display such as (c) (shall you stop "using a dryer" while "watching a television") is added. In this way, the starting behavior is recommended.

In this embodiment, an example to promote a change (disaggregation) to the sole behavior from the simultaneous occurrence behavior is described. However, it is possible to evaluate a social value when the sole behavior is changed to the simultaneous occurrence behaviors by replacing a certain sole behavior with the simultaneous occurrence behaviors including the sole behavior, and predicting and evaluating a behavior sequence on and after the step. If it has a higher society value than the behavior sequence configured by sole behaviors, it is displayed on the display 10.

Third Embodiment

The third embodiment will be explained. In the third embodiment shown in FIG. 21, like reference numerals are used to designate like structural elements corresponding to those like in the embodiment of FIG. 1 and any further explanation is omitted for brevity's sake, and only different elements are described.

A scheduling unit 13 for managing personal scheduling and a spare time detector 14 are provided in this embodiment. The scheduling unit 13 is connected to the spare time detector 14 and the result output unit 9 through radio or a network. The scheduling unit 13 is provided on, for example, a mobile computer, a mobile phone, etc., and manages, for example, a day's scheduling of the object person. Other is similar to FIG. 1.

Figure 22:
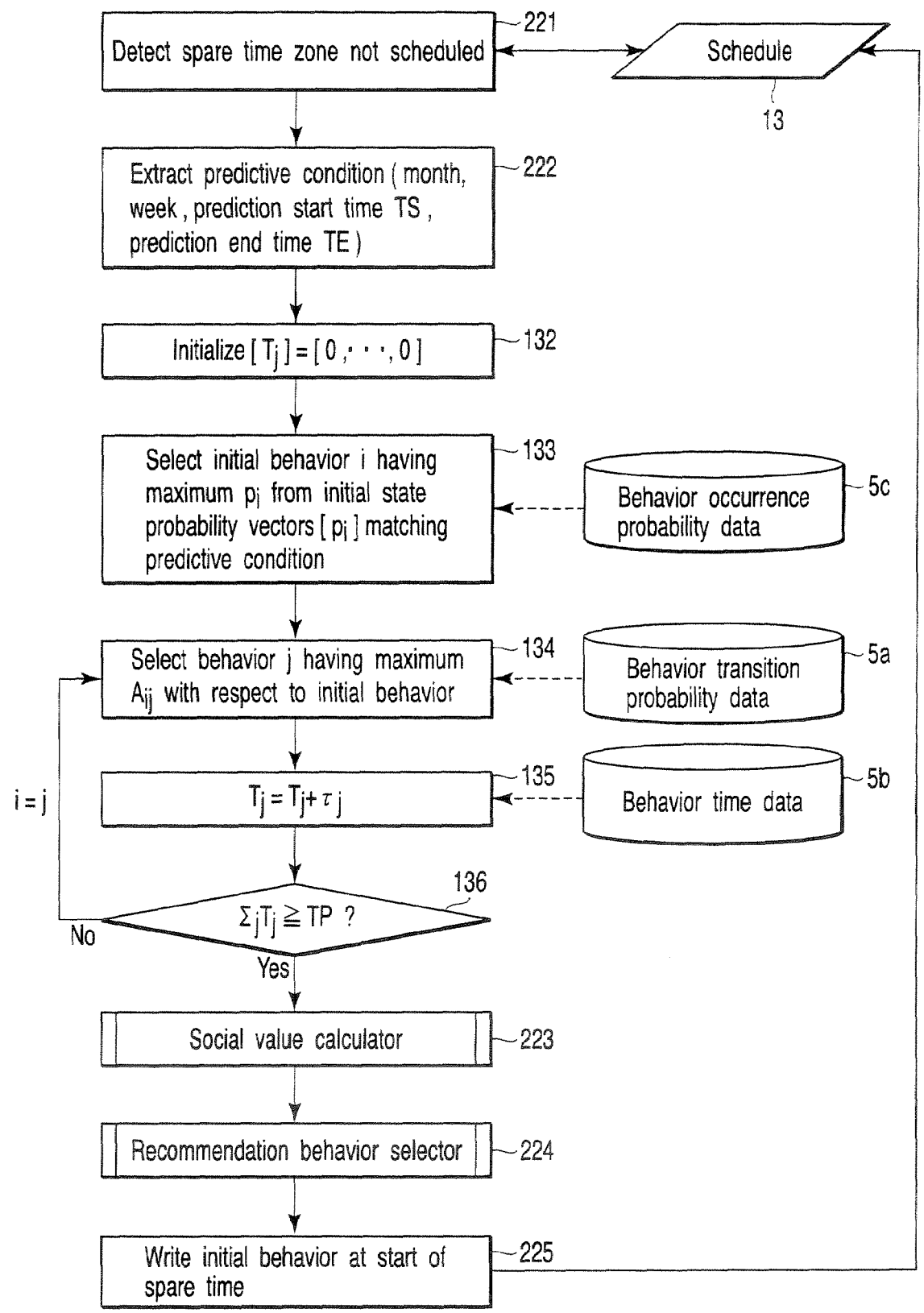
FIG. 22 is a flow chart of explaining a behavior prediction process of a behavior predictor used for the third embodiment.

In FIG. 22, like reference numerals are used to designate like steps corresponding to those like in FIG. 13 and any further explanation is omitted for brevity's sake, but different steps will be described.

In step 221, the spare time detector 14 accesses the scheduling unit 13 at a constant interval (for example, every morning 6:00) (step 221), detects a spare time zone from schedule information of a day, and inputs a detected result to the condition input unit 1.

The condition input unit 1 inputs the month, week, prediction start time TS, prediction end time TE, identification information of the object person, etc., as a behavior prediction condition, using the result of the spare time zone input from the spare time detector 14 (step 222).

The behavior predictor 6 executes a behavior prediction process similar to that of FIG. 13, and estimates a behavior occurrence time vector [Tj] in the spare time acquired from the scheduling unit 13, namely a time zone without a special plan.

In step 223, the social value calculator 7 calculates a value Ei of occurrence environment load per unit time, which is due to selection of the starting behavior i. In step 224, the recommendation behavior selector 8a executes a recommendation behavior selection process similar to that of FIG. 16, and determines whether another starting behavior should be recommended.

If it is desirable to recommend the another starting behavior, information of contents of the recommendation (for example, information of FIGS. 17 and 20) is sent back to the time zone of the scheduling unit 13 (the spare time detected by the spare time detector 14). This starting behavior is written at the beginning of the spare time (step 225).

Figures 23A, 23B, 23C:
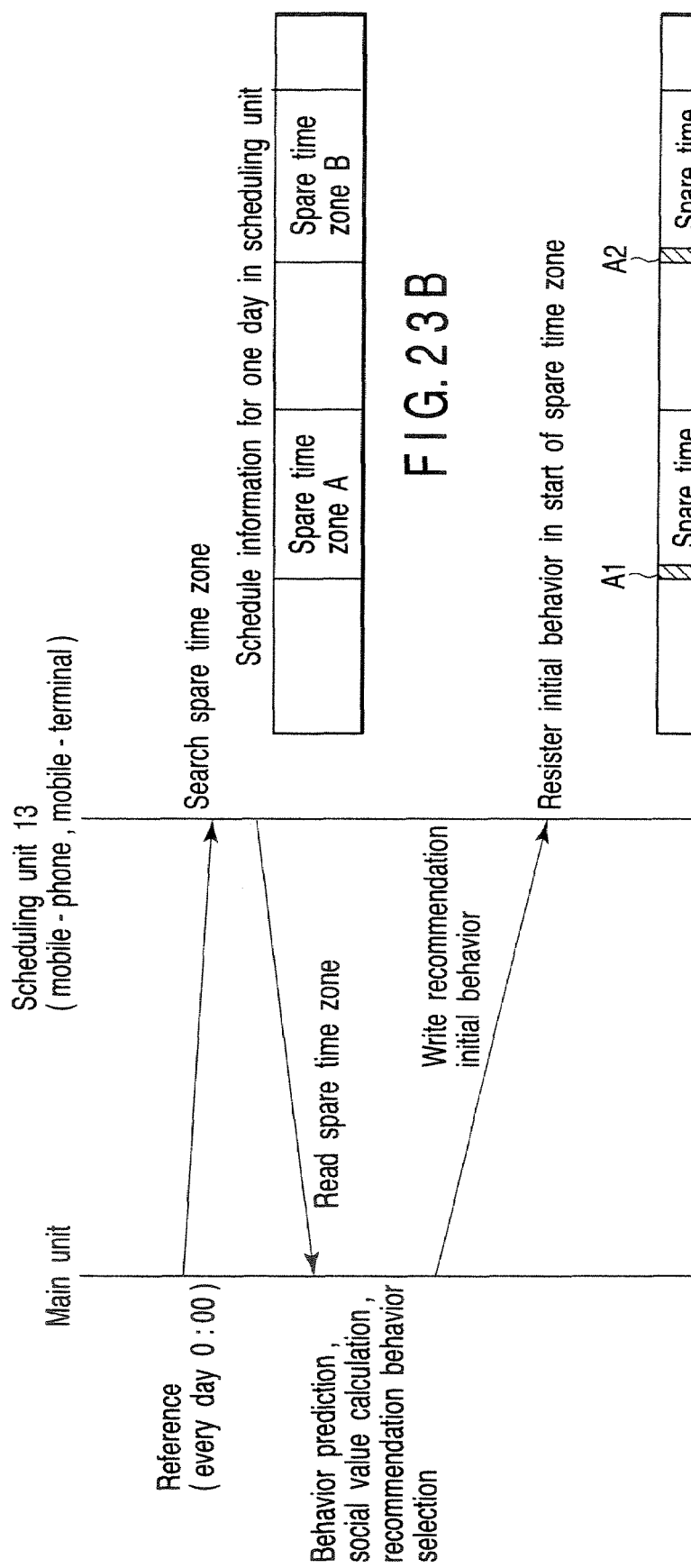
FIG. 23A is a diagram of explaining a flow of cooperative processing of the third embodiment.
FIGS. 23B and 23C are diagrams showing schedule information.

A coordination operation between the main unit and the scheduling unit 13 will be described concretely referring to FIG. 23A. At first, the spare time detector 14 searches contents of the scheduling unit 13 at a constant interval (for example, every morning 6:00). When spare time zones (spare time zones A and B) is in a day's schedule information (FIG. 23 (b)) of the scheduling unit 13, these input spare time zones A and B are read out and input to the condition input unit 1.

The behavior prediction, social value calculation and recommendation behavior selection are executed, and the recommendation starting behavior is written in the scheduling unit 13. In this case, recommendation starting behaviors A1 and B1 are registered at the beginnings of the spare time zones A and B as shown in FIG. 23C. Accordingly, even if the schedule management is done in the way, the user who manages a schedule with the scheduling unit 13 can know easily what may have only to be done in the spare time.

Fourth Embodiment

The fourth embodiment will be explained subsequently. The function of the spare time detector is added to the scheduling unit in this fourth embodiment. Accordingly, the scheduling unit outputs a start instruction for the main unit when a user confronts with a time zone without a specific plan, or before some minutes.

In the fourth embodiment shown in FIG. 24, like reference numerals are used to designate like structural elements corresponding to those like in the embodiment of FIG. 1 and any further explanation is omitted for brevity's sake, and only different elements are described. In this case, a scheduling unit 15 for managing a personal time is provided. The scheduling unit 15 is connected to the condition input unit 1 through radio, a network.

The scheduling unit 15 has a spare time detection function similar to the spare time detector 14, detects a spare time of, e.g., 10 minutes of a spare time zone from schedule information of a day shown in FIG. 25B, and inputs the information to the condition input unit 1 through radio, a network, etc.

The coordination operation between the main unit and scheduling unit 15 will be concretely described referring to FIG. 25A. When the scheduling unit 15 detects the start of spare time from the schedule information of a day before 10 minutes of the spare time A by the spare time detection function, the information of the start time t1 and end time t2 of this spare time is read out and is input to the condition input unit 1. The above described behavior prediction, society value calculation and recommendation behavior selection are executed between the start time t1 and end time t2 of this spare time, and the recommendation starting behavior is written in the scheduling unit 15. In this case, the recommendation starting behavior A1 is registered at the start time t1 of the spare time zone A as shown in FIG. 25 C. Accordingly, even if the schedule management is done in the way, the user who manages a schedule with the scheduling unit 13 can know easily what may have only to be done in the spare time.

Fifth Embodiment

The fifth embodiment will be explained subsequently. The above embodiment is provided for supporting a personal environmental consideration living. However, the present invention can apply to an embodiment for supporting a corporate activity of low environment load.

Since the behavior prediction apparatus of the fifth embodiment is similar to that of FIG. 1, this embodiment will be described referred to FIG. 1. In this case, an apparatus operation signal (ON/OFF of a lathe, for example) in a factory is written in, for example, the behavior correspondence table 2a shown in FIG. 5 as an input signal thereto. Further, a production work (for example, cut of part A) is written in the table as a behavior pattern corresponding to an input signal.

If the behavior prediction apparatus is configured as described above, it is possible to reduce an environmental load for such a production work that the time management is entrusted by personal discretion to some extent.

Sixth Embodiment

The sixth embodiment will be explained subsequently. The previously described embodiments are described using an environmental load as a social value. However, a standpoint having publicity widely as well as environmental load may be taken in.

For example, corpulence is a symptom to threaten nation health in a developed nation, and this apparatus can be applied for improving this symptom.

Since the behavior prediction apparatus of the sixth embodiment is similar to that of FIG. 1, this embodiment will be described referred to FIG. 1. In this case, the environmental load unit consumption database stored in the environmental load unit consumption data storage unit $5d$ is replaced with a consumption calorie basic unit database stored in the consumption calorie unit requirement data memory $5e$ shown in FIG. 27 every behavior unit shown in FIG. 26.

The social value calculator 7 executes a social value calculation process shown in FIG. 27. In this case, the social value calculator 7 multiplies the occurrence time vector $T_j$ of the behavior j calculated with the behavior predictor 6 by the consumption calorie basic unit data $e_j$ read from the consumption calorie basic unit data memory $5e$ to obtain a consumption calorie consumed by the behavior j (step 271).

Further, the social value calculator 7 calculates the sum total of consumption calories of the entire predicted behavior sequence, and divides the sum total by the prediction period TP (=prediction end time TE−prediction start time TS) to output a value $E_i$ (social value information) of a consumption calorie per unit time and unit volume, which is due to selection of the starting behavior i.

Figure 28:
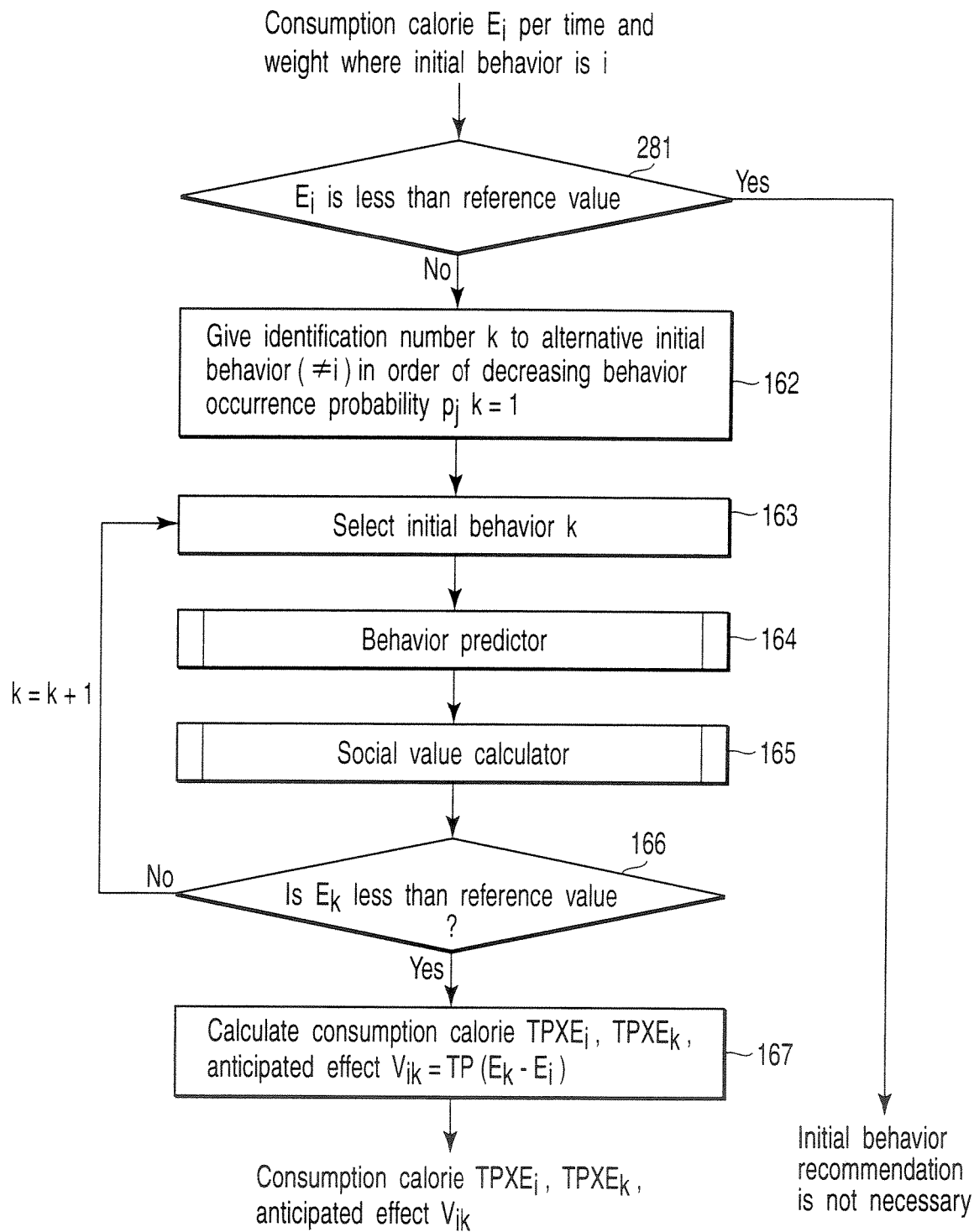
FIG. 28 is a flow chart explaining a recommended behavior selection process of a recommended behavior selector used for the sixth embodiment.

Subsequently, the recommendation behavior selector 8 executes a recommendation behavior selection process shown in FIG. 28. In FIG. 28, like reference numerals are used to designate like steps corresponding to those like in FIG. 16 and any further explanation is omitted for brevity's sake, and only different steps are described.

In step 281, it is determined whether the value $E_i$ of a consumption calorie per unit time and unit volume where the starting behavior is assumed to be i is not less than a reference value. The reference value in this example may be assumed to be optimal living momentum (calorie) per hour and weight calculated from the age, weight and gender of a person. In step 281, if the value $E_i$ is more than the reference value, the process finishes without selecting the recommendation behavior. On the other hand, if the value $E_i$ is not more than the reference value, the process advances to on and after step 162 to execute the operation similar to that described in FIG. 16.

According to this embodiment, by selecting a behavior sequence to exceed the reference value as a behavior sequence to be recommended, the starting behavior anticipated to cause a behavior sequence to exceed a reference consumption calorie can be predicted and provided in a certain spare time zone.

Seventh Embodiment

The seventh embodiment will be explained subsequently. The previously described embodiments are described using an environmental load as a social value. However, the present invention can apply for selecting and providing a starting behavior to reduce an occurrence risk of domestic accident.

Since the behavior prediction apparatus of the seventh embodiment is similar to that of FIG. 1, this embodiment will be described referred to FIG. 1. In this case, the environmental load unit consumption database stored in the environmental load unit consumption data storage unit 5d is replaced with a domestic accident occurrence probability database shown in FIG. 30 and stored in an accident occurrence probability data memory 5f shown in FIG. 30. This domestic accident occurrence probability data is obtained by calculating an accident occurrence probability (fit/person) every unit activity based on statistical data, where fit indicates $1/10^9$ times and is an index representing what number of accidents occur during $10^9$ hours.

Figures 29, 30:
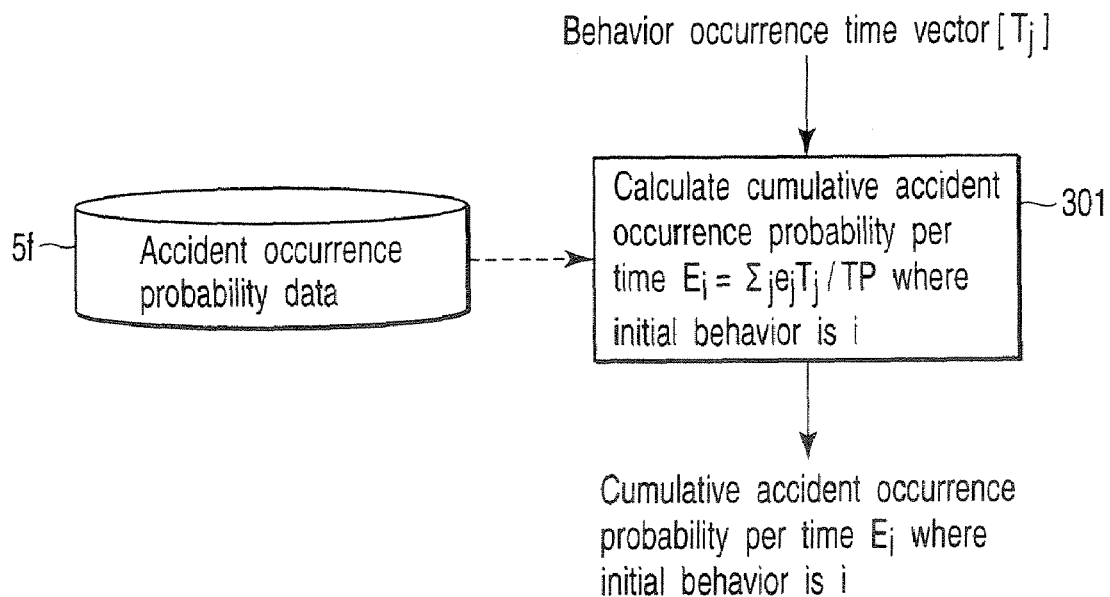
FIG. 29 is a diagram showing a domestic accident occurrence probability data stored in an accident concurrent probability database storage used for a seventh embodiment.
FIG. 30 is a flow chart of explaining a social value computation process of a social value calculation unit used for the seventh embodiment.

The social value calculator 7 executes the social value computation process shown in FIG. 30. In this case, the social value calculator 7 multiplies the occurrence time vector Tj of the behavior j calculated with the behavior predictor 6 by the domestic accident occurrence probability data ej read from the accident occurrence probability data memory 5f to obtain an accumulative accident occurrence probability occurring by the behavior j (step 301).

Further, the social value calculator 7 calculates the sum total of cumulative accident occurrence probabilities of the entire predicted behavior sequence, and divides the sum total by the prediction period TP (=prediction end time TE−prediction start time TS) to output a value Ei (social value information) of a cumulative accident occurrence probability per unit time, which is due to selection of the starting behavior i.

Figure 31:
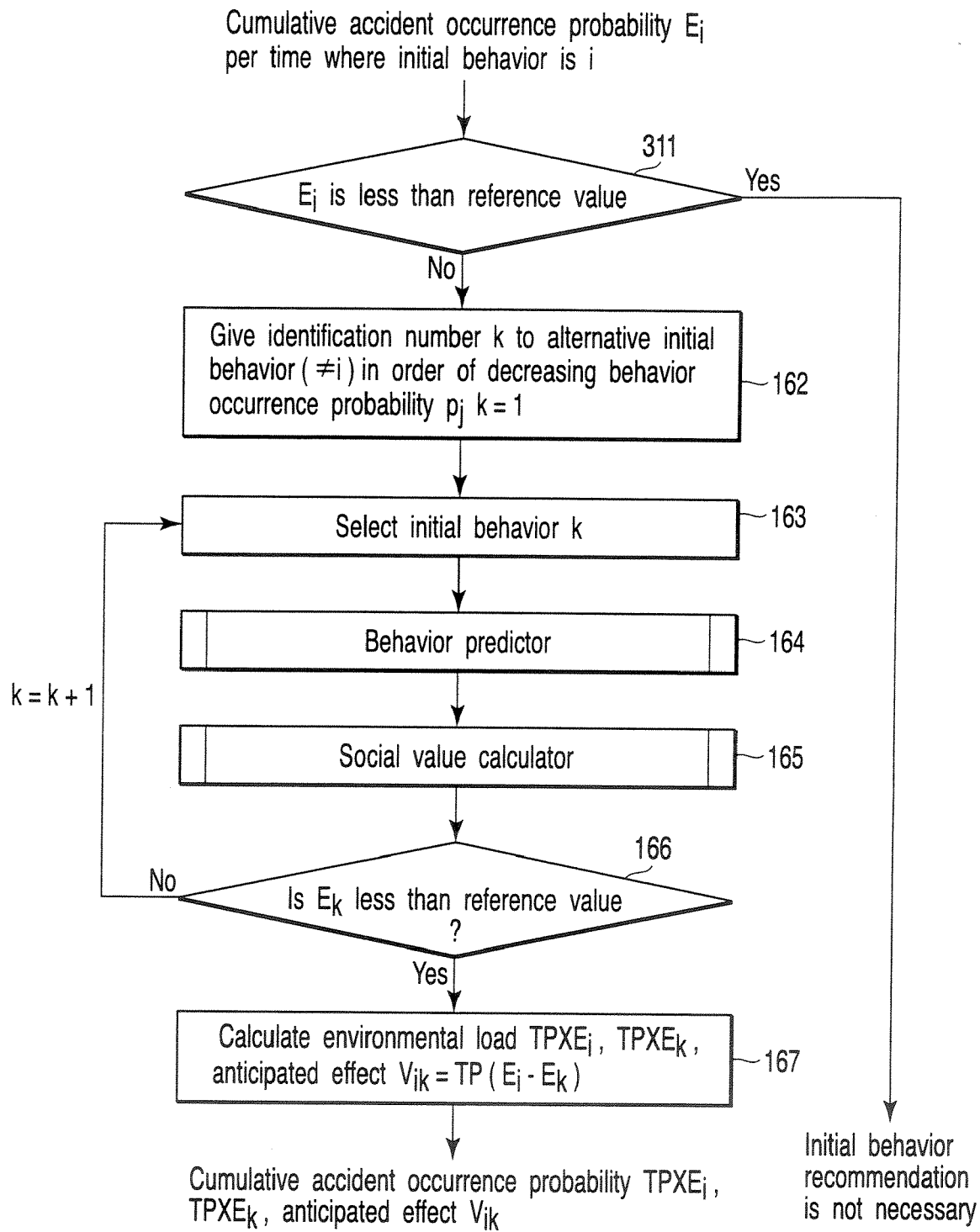
FIG. 31 is a flow chart of explaining a recommended behavior selection process of a recommended behavior selector used for the seventh embodiment.

Subsequently, the recommended behavior selector 8 executes a recommendation behavior selection process shown in FIG. 31. In this case, in FIG. 31, like reference numerals are used to designate like steps corresponding to those like in FIG. 16 and any further explanation is omitted for brevity's sake, and only different steps are described.

In step 311, it is determined whether the value Ei of cumulative accident occurrence probability per unit time where the starting behavior is assumed to be i is not more than the reference value. The reference value in this example uses a suitable value obtained by experience. In step 311, if the value Ei is less than the reference value, the process is finished without selecting the recommendation behavior. On the other hand, if the value Ei is not less than the reference value, the process advances to step 162 to execute the similar operation.

According to this embodiment, by selecting a behavior sequence less than the reference value as a behavior sequence to be recommended, the starting behavior introducing a behavior sequence always less than the reference value can be predicted and provided.

According to the present invention, a behavior in a certain prediction period can be predicted in a direction increasing a social value, and guided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A behavior prediction apparatus comprising:
an input unit configured to input sole behaviors of a human, detect simultaneous occurrence behaviors, and calculate simultaneous occurrence probability of the behaviors;
a behavior discrimination unit configured to specify a behavior pattern based on correspondence between behavior patterns including the behaviors corresponding to the simultaneous occurrence probability and actual behavior patterns corresponding to actual behaviors of the human;
an information generation/recording unit configured to generate behavior history information of the specified behavior pattern within a constant period, and to generate and record information of each of a behavior transition probability of changing from one behavior to another behavior, a behavior time during which the behavior is done and a behavior occurrence probability indicating a ratio of the behavior time to a time zone, for each of the actual behavior patterns, based on the behavior history information;
a behavior prediction unit configured to obtain a starting behavior to be executed at first in prediction from the information of the behavior occurrence probability for a prediction period, select another behavior pattern for the starting behavior in order of the behavior occurrence probability based on the information of the behavior occurrence probability, and add the information of the behavior time to the selected behavior pattern to output behavior prediction information corresponding to the prediction period;
a social value calculation unit configured to obtain a social value per unit time, which is due to selection of the starting behavior, using the behavior prediction information, social value unit information prepared for beforehand and the prediction period;
a recommendation behavior selector to compare the social value with a reference value and select a recommendation behavior based on a comparison result; and
an output unit to provide a selected recommendation behavior to a user.

2. The apparatus according to claim 1, wherein the input unit labels two or more behaviors capable of occurring at the same time as a behavior pattern.

3. The apparatus according to claim 1, wherein the input unit allows behaviors reflecting a preference to input as behaviors capable of occurring at the same time.

4. The apparatus according to claim 1, wherein the behavior discrimination unit includes a table creation unit configured to create a behavior corresponding table representing the correspondence between the behavior patterns and the input behavior patterns, and the behavior discrimination unit specifies a behavior pattern based on the behavior corresponding table.

5. The apparatus according to claim 1, wherein the behavior prediction unit uses a spare time of the to-be-predicted object as the prediction period.

6. The apparatus according to claim 1, further including a scheduling unit configured to manage a schedule of the to-be-predicted object, and a spare time detecting unit configured to detect a spare time zone of the schedule, and input it to the behavior prediction unit as the prediction period.

7. The apparatus according to claim 1, further including a scheduling unit configured to manage a schedule of the to-be-predicted object and having a spare time detection function for detecting a spare time zone of the schedule before a given time from a start time of the spare time zone to input it to the behavior prediction unit as the prediction period.

8. The apparatus according to claim 1, wherein the social value calculation unit calculates an environment load per unit time as the social value, using environmental load unit consumption information as the social value unit information.

9. The apparatus according to claim 1, wherein the social value calculation unit is configured to calculate a consumption calorie per unit time as the social value, using consumption calorie unit requirement information as the social value unit information.

10. The apparatus according to claim 1, wherein the social value calculation unit is configured to calculate an accumulation accident occurrence probability per unit time as the social value, using accident occurrence probability information as the social value unit information.

11. The apparatus according to claim 1, further including a record/remove unit configured to record the number of behavior occurrence times during a certain period and remove a behavior pattern if the number of occurrence times of the specific behavior pattern reaches a specified value.

12. A behavior prediction apparatus comprising:
an input unit configured to input sole behaviors of a human, detect simultaneous occurrence behaviors, and calculate simultaneous occurrence probability of the behaviors;
a behavior discrimination unit configured to specify a behavior pattern based on correspondence between behavior patterns including the behaviors corresponding to the simultaneous occurrence probability and actual behavior patterns corresponding to actual behaviors of the human;
an information generation/recording unit configured to generate behavior history information of the specified behavior pattern within a constant period, and to generate and record information of each of a behavior transition probability of changing from one behavior to another behavior, a behavior time during which the behavior is done and a behavior occurrence probability, for each of the actual behavior patterns, based on the behavior history information;
a behavior prediction unit configured to obtain a starting behavior from the information of the behavior occurrence probability for a prediction period, select another behavior pattern for the starting behavior in order of the behavior occurrence probability based on the information of the behavior occurrence probability, and add the information of the behavior time to the selected behavior pattern to output behavior prediction information corresponding to the prediction period;
a social value calculation unit configured to obtain a social value per unit time, which is due to selection of the starting behavior, using the behavior prediction information, social value unit information prepared for beforehand and the prediction period;
a recommendation behavior selecting unit configured to compare the social value information with a reference value prepared beforehand and select a recommendation behavior based on a comparison result; and
a display unit configured to display the recommendation behavior.

13. The apparatus according to claim 12, wherein the recommendation behavior selecting unit is configured to obtain a starting behavior different from the behavior occurrence probability information using the comparison result, compare society value information obtained for the different starting behavior by a behavior prediction and a social value calculation with the reference value again, and select the recommendation behavior based on the comparison result.

14. The apparatus according to claim 12, wherein the input unit labels two or more behaviors capable of occurring at the same time as a behavior pattern.

15. The apparatus according to claim 12, wherein the input unit allows behaviors reflecting a preference to input as behaviors capable of occurring at the same time.

16. The apparatus according to claim 12, wherein the behavior prediction unit uses a spare time of the to-be-predicted object as the prediction period.

17. The apparatus according to claim 12, wherein the social value calculation unit calculates an environment load per unit time as the social value, using environmental load unit consumption information as the social value unit information, and the recommendation behavior selecting unit is configured to compare the environmental load with the reference value and select a recommendation behavior from the comparison result.

18. The apparatus according to claim 12, wherein the social value calculation unit is configured to calculate a consumption calorie per unit time as the social value, using consumption calorie unit requirement information as the social value unit information, and the recommendation behavior selecting unit is configured to compare the consumption calorie with the reference value and select a recommendation behavior from the comparison result.

19. The apparatus according to claim 12, wherein the social value calculation unit is configured to calculate an accumulation accident occurrence probability per unit time as the social value, using accident occurrence probability information as the social value unit information, and the recommendation behavior selecting unit is configured to compare the accumulation accident occurrence probability per unit time with the reference value and select a recommendation behavior from the comparison result.

20. A behavior prediction method comprising:
inputting sole behaviors of sole behaviors of a human;
detecting simultaneous occurrence behaviors;
calculating simultaneous occurrence probability of the behaviors;
specifying a behavior pattern based on correspondence between behavior patterns including the behaviors corresponding to the simultaneous occurrence probability and actual behavior patterns corresponding to actual behaviors of the human;
generating behavior history information of the specified behavior patterns within a constant period;
generating and recording information of each of a behavior transition probability of changing from one behavior to another behavior, a behavior time during which the behavior is done and a behavior occurrence probability, for each of the actual behavior patterns, based on the behavior history information;
obtaining a starting behavior from the information of the behavior occurrence probability for a prediction period;
selecting another behavior pattern for the starting behavior in order of the behavior occurrence probability based on the information of the behavior occurrence probability;
adding the information of the behavior time to the selected behavior pattern to output behavior prediction information corresponding to the prediction period;
obtaining social value information per unit time, which is due to selection of the starting behavior, using the behavior prediction information, social value unit information prepared for beforehand and the prediction period;
comparing the social value information with a reference value prepared beforehand;
selecting a recommendation behavior based on a comparison result; and
displaying the recommendation behavior.

21. The behavior prediction apparatus according to claim 1, further comprising a data base containing an environmental load unit consumption database, a consumption calorie unit consumption database, and an accident occurrence probability database.

* * * * *